United States Patent
Fan et al.

(10) Patent No.: US 10,452,680 B1
(45) Date of Patent: Oct. 22, 2019

(54) CATCH-UP REPLICATION WITH LOG PEER

(71) Applicant: Amazon Technologies, Inc., Reno, NV (US)

(72) Inventors: Jianhua Fan, Issaquah, WA (US); Benjamin Arthur Hawks, Seattle, WA (US); Norbert Paul Kusters, Redmond, WA (US); Nachiappan Arumugam, Seattle, WA (US); Danny Wei, Seattle, WA (US); John Luther Guthrie, II, Bellevue, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 457 days.

(21) Appl. No.: 14/866,659

(22) Filed: Sep. 25, 2015

(51) Int. Cl.
*G06F 16/27* (2019.01)
*G06F 16/955* (2019.01)
*G06F 16/22* (2019.01)

(52) U.S. Cl.
CPC .......... *G06F 16/27* (2019.01); *G06F 16/2246* (2019.01); *G06F 16/955* (2019.01)

(58) Field of Classification Search
CPC ...... G06F 17/30212–30215; G06F 16/27–273; G06F 16/184–1844
See application file for complete search history.

(56) References Cited

U.S. PATENT DOCUMENTS

| | | | |
|---|---|---|---|
| 6,131,148 A | 10/2000 | West | |
| 6,192,365 B1* | 2/2001 | Draper | G06F 9/466 707/648 |
| 6,473,839 B1* | 10/2002 | Kremser | H04L 12/40006 709/211 |
| 6,671,705 B1 | 12/2003 | Duprey | |
| 7,127,633 B1* | 10/2006 | Olson | G06F 11/2092 714/4.4 |
| 7,373,366 B1 | 5/2008 | Chatterjee | |
| 8,689,043 B1 | 4/2014 | Bezbaruah | |
| 8,843,441 B1* | 9/2014 | Rath | G06F 17/30578 707/614 |
| 8,880,488 B1 | 11/2014 | Xie | |

(Continued)

OTHER PUBLICATIONS

Notice of Allowance issued in U.S. Appl. No. 14/866,652 dated Apr. 10, 2017.

(Continued)

*Primary Examiner* — Robert W Beausoliel, Jr.
*Assistant Examiner* — Nirav K Khakhar
(74) *Attorney, Agent, or Firm* — Hogan Lovells US LLP

(57) ABSTRACT

Master-slave pairs can be used to provide data redundancy in an electronic data environment. A master peer can include a B-tree with references to the corresponding data. When provisioning a slave, the master can send a point-in-time copy of the B-tree to the slave, which can allocate the necessary space on local storage and update the references of the B-tree to point to the local storage for the slave. If the master and slave become disconnected, one of the peers can function as a solo master until the peers are again connected, at which point the old peer can be brought current or a new slave provisioned. A log peer can also be provisioned by a solo master, which can store data for operations received during the disconnect for use in catching up a slave peer, which could be the old slave, the log peer, or a new peer.

20 Claims, 15 Drawing Sheets

(56) References Cited

U.S. PATENT DOCUMENTS

| | | | |
|---|---|---|---|
| 9,239,766 B2 | 1/2016 | Burr | |
| 9,753,813 B1 | 9/2017 | Fan | |
| 2002/0143798 A1* | 10/2002 | Lisiecki | G06F 17/3089 |
| 2003/0041283 A1* | 2/2003 | Murphy | G06F 11/1662 |
| | | | 714/13 |
| 2004/0093361 A1 | 5/2004 | Therrien | |
| 2004/0268067 A1 | 12/2004 | Yamagami | |
| 2007/0260696 A1 | 11/2007 | Bohannon | |
| 2007/0276983 A1* | 11/2007 | Zohar | G06F 3/0607 |
| | | | 711/100 |
| 2010/0114824 A1 | 5/2010 | Krishnaprasad | |
| 2011/0296133 A1* | 12/2011 | Flynn | G06F 11/1048 |
| | | | 711/171 |
| 2011/0320403 A1 | 12/2011 | O'Krafka | |
| 2012/0166390 A1 | 6/2012 | Merriman | |
| 2013/0110774 A1* | 5/2013 | Shah | G06F 11/1474 |
| | | | 707/610 |
| 2014/0040199 A1* | 2/2014 | Golab | G06F 17/30309 |
| | | | 707/634 |
| 2014/0181027 A1* | 6/2014 | Whitehead | G06F 17/30174 |
| | | | 707/639 |
| 2014/0181035 A1 | 6/2014 | Moue | |
| 2015/0261443 A1* | 9/2015 | Wei | G06F 3/065 |
| | | | 711/162 |
| 2015/0261563 A1* | 9/2015 | Guerin | G06F 9/466 |
| | | | 707/703 |
| 2015/0363124 A1* | 12/2015 | Rath | G06F 11/2097 |
| | | | 709/219 |
| 2016/0142249 A1* | 5/2016 | Wu | H04L 41/0806 |
| | | | 709/222 |
| 2016/0328168 A1* | 11/2016 | Wei | G06F 3/065 |

OTHER PUBLICATIONS

Notice of Allowance issued in U.S. Appl. No. 14/866,655 dated May 12, 2017.
Non-Final Office Action issued in U.S. Appl. No. 15/694,684 dated Nov. 24, 2017.
Non-Final Office Action issued in U.S. Appl. No. 14/866,667 dated Jan. 4, 2018.
Ex-Parte Quayle Office Action issued in U.S. Appl. No. 15/694,684 dated Jun. 29, 2018.
Notice of Allowance issued in U.S. Appl. No. 15/694,684 dated Sep. 17, 2018.
Final Office Action issued in U.S. Appl. No. 14/866,667 dated Aug. 29, 2018.
Non-Final Office Action issued in U.S. Appl. No. 14/866,667 dated Jan. 10, 2019.

* cited by examiner

US 10,452,680 B1

CATCH-UP REPLICATION WITH LOG PEER

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. Multiple users can share resources such as remote servers and data repositories, wherein the users can concurrently send multiple requests to be executed against the same resource. The resources can be physical resources or virtual resources provided through virtualization.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide for data redundancy and reduce the likelihood of data loss, many data volumes are replicated with two copies. It can be difficult to maintain consistency between copies due to events such as power failures, lost messages, and dropped connections. Further, conventional replication protocols require in-depth knowledge of the data being replicated, with each new feature wanting to use replication needing to change the replication protocol.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In particular, various embodiments provision a slave copy for redundant data storage by first generating a point-in-time snapshot of a persistent key-value store, such as a B-tree, of a master copy that requires a slave for replication. The snapshot can be used to determine whether the slave is able to allocate the appropriate storage, for example, before the transfer of the actual data to be replicated begins. Such an approach can provide for a quick verification of the slave and minimize the amount of time and resources needed for such verification. In the event of a disconnection between the master and slave, one of the peers can be selected to act as a solo master, which can accept and commit new I/O requests during the period of disconnection. When the peers are again connected, the solo master can forward information to the other peer to attempt to cause the peers to again be synchronized to function as redundant peers. If the effort needed to bring the old peer up to date is substantial, a new slave may be provisioned using a state transfer process. In some embodiments a slave peer may be provisioned that can store copies of I/O operations received during the disconnect period. When the peers are reconnected (or after a maximum disconnection period is reached or another such action occurs), the operation data can be provided to the slave peer to cause that peer to be up to date. If the master does not have all the operation data, the master can read the data from the log peer to forward to the slave peer. Depending upon the effort needed to bring the old peer up to date, the system may decide instead to cause the log peer to be the new slave or provision a new slave peer, among other such options.

Various other applications, processes, and uses are presented below with respect to the various embodiments.

Figure 1:
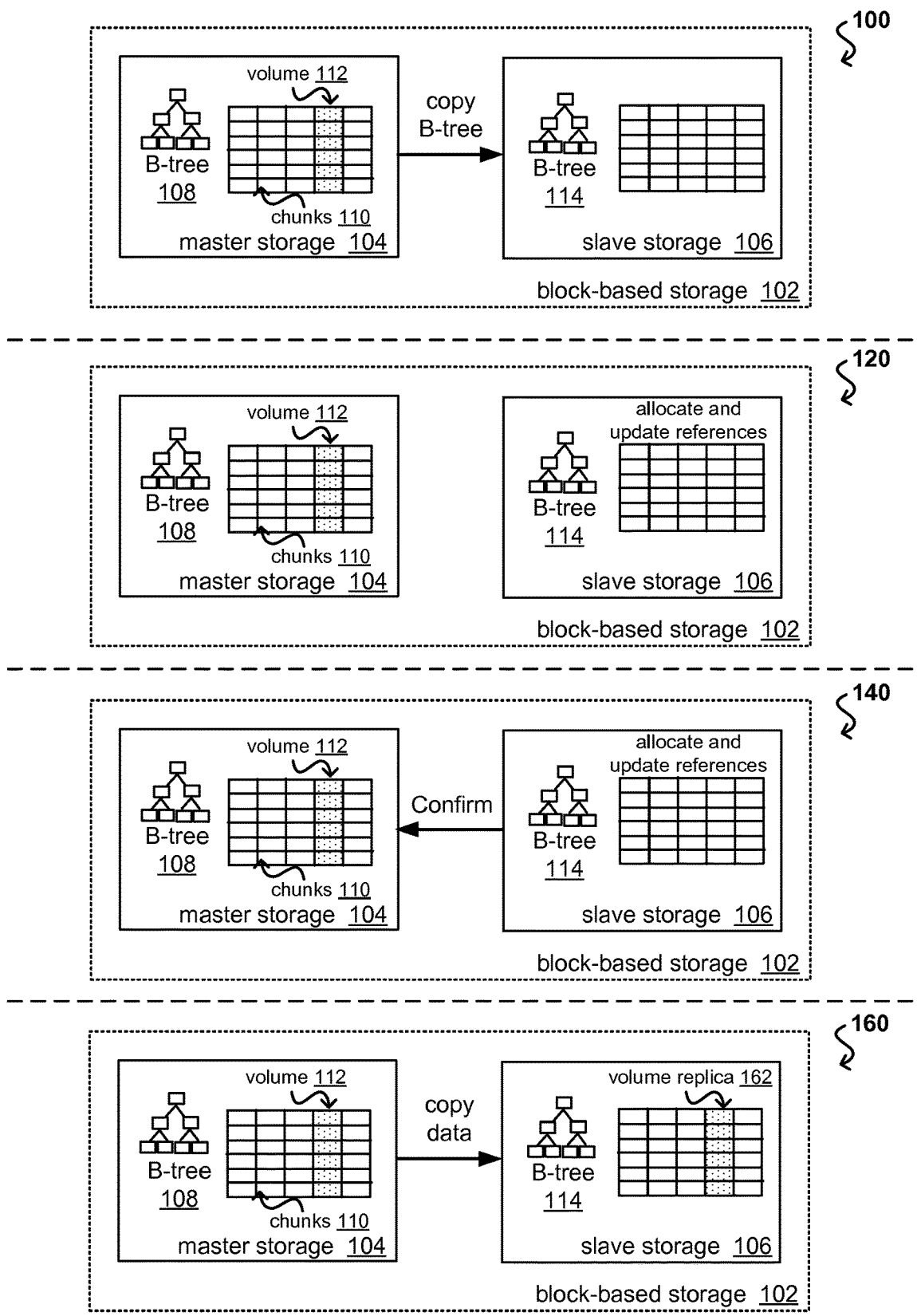
FIG. 1 illustrates a series of block diagrams demonstrating a provisioning process for a slave copy that can be utilized in accordance with various embodiments.

FIG. 1 illustrates an example overview of portions of one such example process for provisioning a slave copy for a block-based storage 102 system or service that can be utilized in accordance with various embodiments. In this example, data storage volumes can be presented as block devices to customers, addressable via read/write requests using an offset, length, and data. A data volume 112 can be stored on a server along with a type of persistent key-value store, such as metadata, a B-tree 108, or another log-structured merge tree. A B-tree in general is a tree data structure that provides for sequential operations to be performed in logarithmic time. A B-tree is typically optimized for systems that manage large blocks of data. Internal nodes of a B-tree can have a variable number of child nodes within a pre-defined range, and the number of child nodes changes when data is inserted or removed from a node of the B-tree. Each internal node can contain a number of keys, which divide the sub-trees. A B-tree can maintain the keys in a sorted order, which enables sequential traversing of the tree structure.

A B-tree used for data volumes in accordance with various embodiments can be at least somewhat different from a conventional B-tree, as a B-tree in this example can store key, value, data-reference triplets, and can map those triplets to a block device representation. A data-reference is essentially a pointer to a location of the data. The data for a storage volume thus does not actually reside inside the volume's B-tree, but rather the B-tree points to the data. The main responsibility of the data storage volume is to store customer data, but arbitrary metadata can also be stored in the data storage volume in at least some embodiments.

In some embodiments, the master storage on a server can be divided into partitions, such as a log partition and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server, which can store multiple B-trees and associated data. It at least some embodiments the writes first go to the log and then can later be written to the data partition. In some embodiments the B-tree 108 for a volume is stored in the log and the corresponding data volume 112, to which the B-tree points, is stored in either the log or the data partition.

When a slave storage copy 106 is to be provisioned, a point-in-time snapshot of the master B-tree 108, or other persistent key-value store, can be generated and sent to the slave 106, as indicated in the first situation 100 of FIG. 1. The slave 106 can store a local copy 114 of the B-tree in an appropriate location, such as log storage for the slave, and determine an amount of space to allocate for the data indicated by the local copy 114. Since the B-tree will initially include references to storage locations local to the master 104, the slave can update the references to point to the allocated local storage as illustrated in the second example situation 120 illustrated in FIG. 1. The slave can allocate slightly more storage than is needed in order to allow for additional data or variations to be implemented that are received to the master during the replication process. Once the local copy 114 of the B-tree is updated and the appropriate local space allocated, the slave can send a confirmation or acknowledgement to the master 140, as indicated in the third example situation 140 of FIG. 1. The master storage 104 can then determine the chunks 110 of data for a current operation of the B-tree to transfer to the slave to be committed to the slave volume replica 162 until all data has been transferred and the slave is an up-to-date replica of the master, as indicated in the fourth example situation 160 of FIG. 1.

Since the point-in-time B-tree from the master is generally much smaller than the actual data to be copied, the slave can quickly determine whether adequate space is available for the data, and allocate that data as necessary, before the data transfer begins. If the provisioning of the slave needs to be cancelled or rolled back, for example, the quick determination results in minimal unnecessary data transfer or delay, particularly with respect to conventional provisioning approaches. Further, fixing the references in the slave B-tree does not involve any data transfer and is all local to the slave, such that the entire process of creating and updating the tree can be performed relatively quickly. This also minimizes the amount of data for new writes that must be stored during the provisioning process, which conserves resources and reduces the likelihood of an event that can cause inconsistencies between the copies, such as power failures or other such events.

Figure 2:
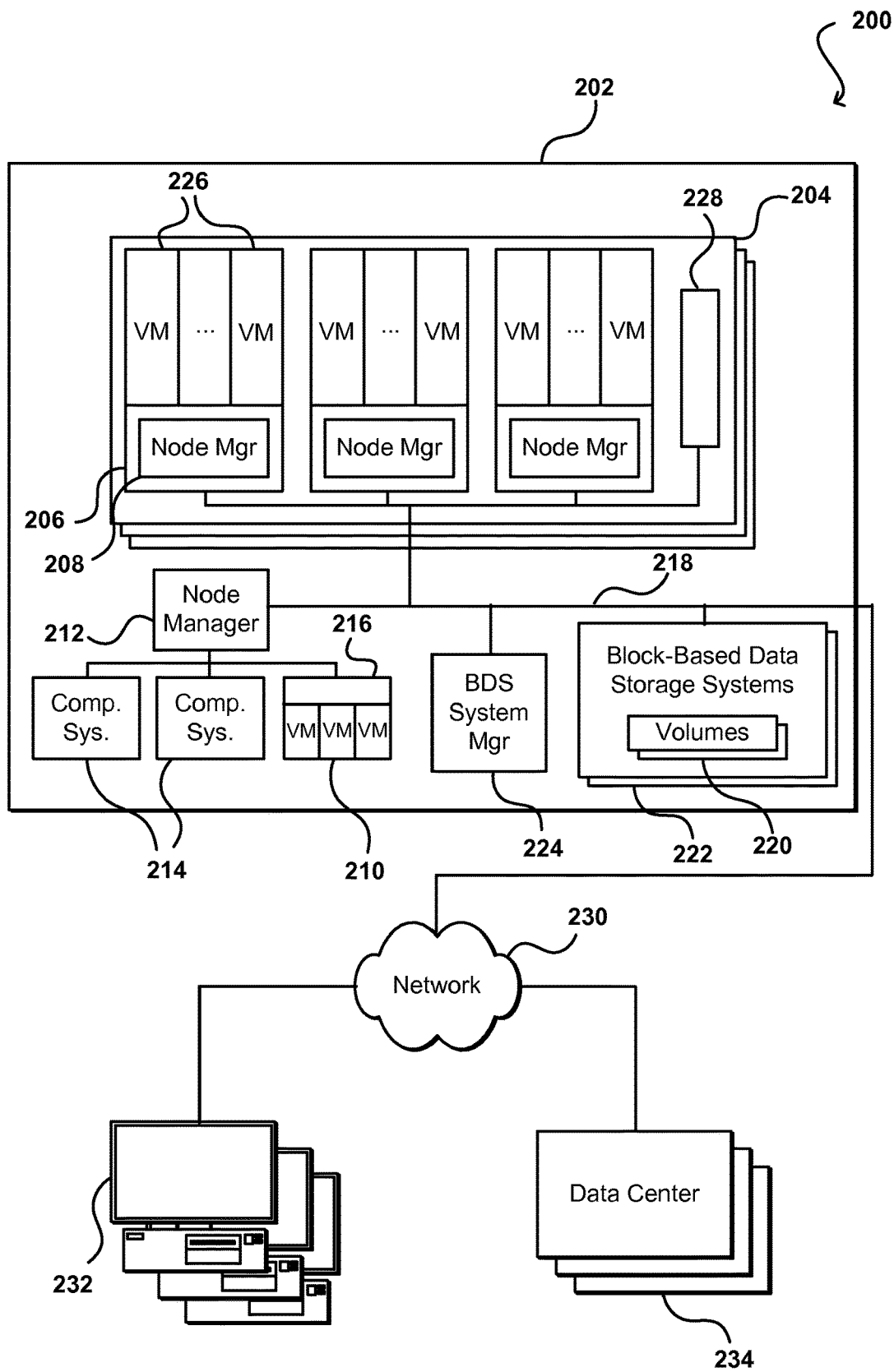
FIG. 2 illustrates an example environment in which aspects of the various embodiments can be implemented.

FIG. 2 illustrates an example network configuration 200 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example the data center 202 also includes a computing system 224 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 234, or other remote computing systems 232 external to the data center). In particular, in this example the data center 202 includes a pool of multiple block-based data storage systems 222, which each have local block-based storage for use in storing one or more volume copies 220. Access to the volume copies 220 is provided over the internal network(s) 218 to programs executing on various resource nodes 210 and 214. As discussed in greater detail elsewhere, a block-based data storage system manager module 224 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 222 may coordinate with the node manager modules 212, 208 to manage use of volumes by programs executing on associated resource nodes, while in other embodiments the node manager modules may not be used to manage such volume use. In addition, in other embodiments, one or more BDS system manager modules 224 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 222 (e.g., in a peer-to-peer manner, without any separate centralized BDS system manager module on a computing system 224).

In this example, the various host computing systems, server block data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 102 may further be interconnected with one or more other networks or other connection mediums, such as a high-bandwidth connection over which the block-based storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
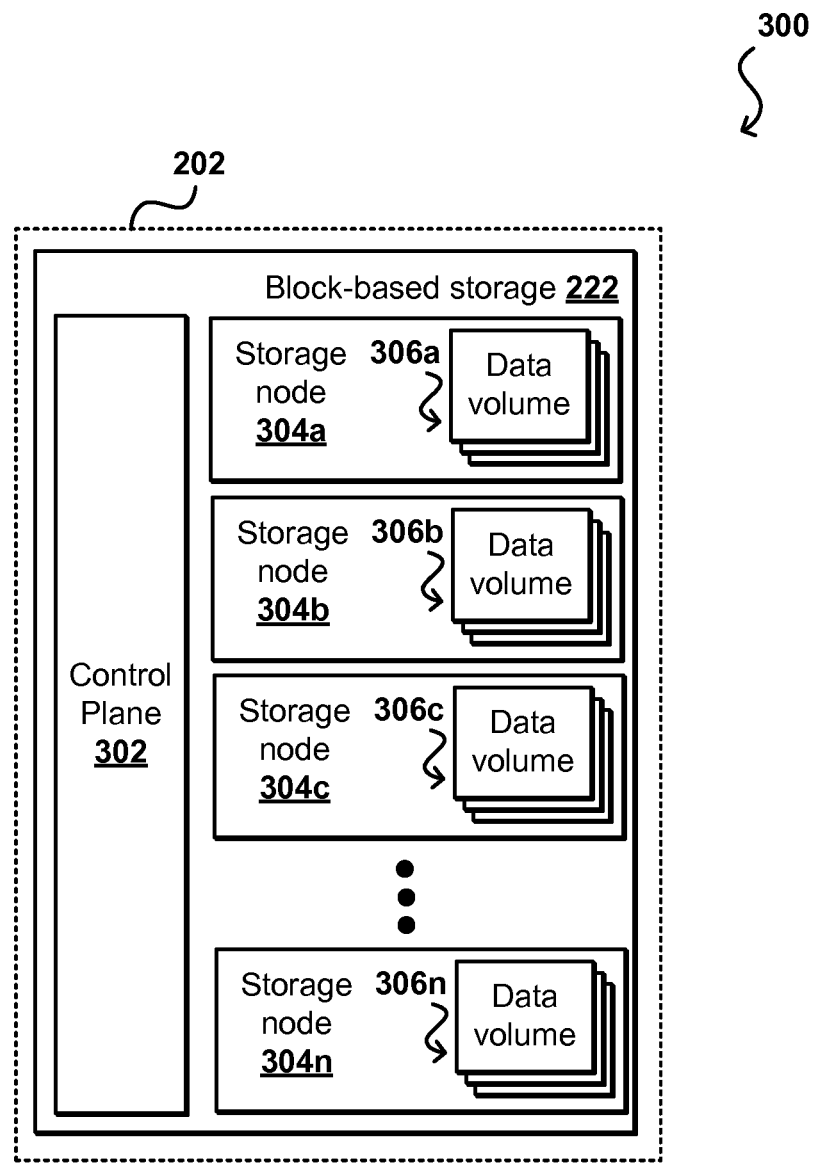
FIG. 3 illustrates components of an example block-based data storage service that can be utilized in accordance with various embodiments.

A block-based storage service provider can implement functionality such as page cache write logging and the dynamic modifying of durability properties for data volumes. FIG. 3 is a block diagram illustrating components of a provider environment 202 such as is described with respect to FIG. 2. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, as may include a block-based storage service 222 in at least some embodiments. A provider environment 300, or other such multi-tenant or shared resource environment, may be set up by an entity such as a company or a public sector organization to provide one or more services (such as various types of cloud-based computing or storage) accessible via the Internet and/or other networks to clients. The provider environment 202 may include numerous data centers hosting various resource pools, such as collections of physical and/or virtualized computer servers, storage devices, networking equipment and the like, used to implement and distribute the infrastructure and services offered by the provider environment 202. In some embodiments, the provider environment 202 may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances that make use of particular data volumes, providing virtual block storage for the compute instances.

In various embodiments, the provider environment 202 implements a block-based storage 222 system or service for performing storage operations. The example block-based storage 222 is a storage system, composed of a pool of multiple independent storage nodes 304a, 304b, 304c through 304n (e.g., server block data storage systems), which provide block level storage for storing one or more sets of data volumes 306a, 306b, 306c, through 306n. The data volumes 306 can be mapped to particular clients, providing virtual block-based storage (e.g., hard disk storage or other persistent storage) as a contiguous set of logical blocks. In some embodiments, a data volume 306 may be divided up into multiple data chunks (including one or more data blocks) for performing other block storage operations, such as snapshot operations or replication operations.

A volume snapshot of a data volume 306 may be a fixed point-in-time representation of the state of the data volume. In some embodiments, volume snapshots may be stored remotely from a storage node 304 maintaining a data volume 306, such as in another storage service. Snapshot operations may be performed to send, copy, and/or otherwise preserve the snapshot of a given data volume in another storage location, such as a remote snapshot data store in another storage service.

A block-based storage service 222 can implement a block-based storage service control plane 302 to assist in the operation of the block-based storage service 222. In various embodiments, the block-based storage service control plane 302 assists in managing the availability of block data storage to clients, such as programs executing on compute instances provided by a virtual compute service and/or other network-based services located within the provider environment 202 and/or optionally computing systems (not shown) located within one or more other data centers, or other computing systems external to the provider network and available over at least one network. Access to the data volumes 306 may be provided over an internal network within the provider network 202 or externally via an appropriate network, in response to block data transaction instructions.

A block-based storage service control plane 302 can provide a variety of services related to providing block level storage functionality, including the management of user accounts (e.g., creation, deletion, billing, collection of payment, etc.). The block-based storage service control plane 302 may further provide services related to the creation, usage and deletion of data volumes 306 in response to configuration or other such requests. The block-based storage service control plane 302 can also provide services related to the creation, usage, and deletion of volume snapshots on another storage service. The block-based storage service control plane 302 may also provide services related to the collection and processing of performance and auditing data related to the use of data volumes 306 and snapshots of those volumes.

The provider environment 202 may also implement other storage services, as noted above. Another storage service may provide a same or different type of storage as provided by the block-based storage service 222. For example, in some embodiments another storage service may provide an object-based storage service, which may store and manage data as data objects. For example, volume snapshots of various data volumes 306 may be stored as snapshot objects for a particular data volume 306. In addition to another storage service, the provider environment 202 may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the network environment 202. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 306, or other network-based service in the provider environment 202 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 306 in a manner that is transparent to applications implemented on the client, utilizing computational resources provided by the compute instance or block storage provided by the data volume 306.

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 4:
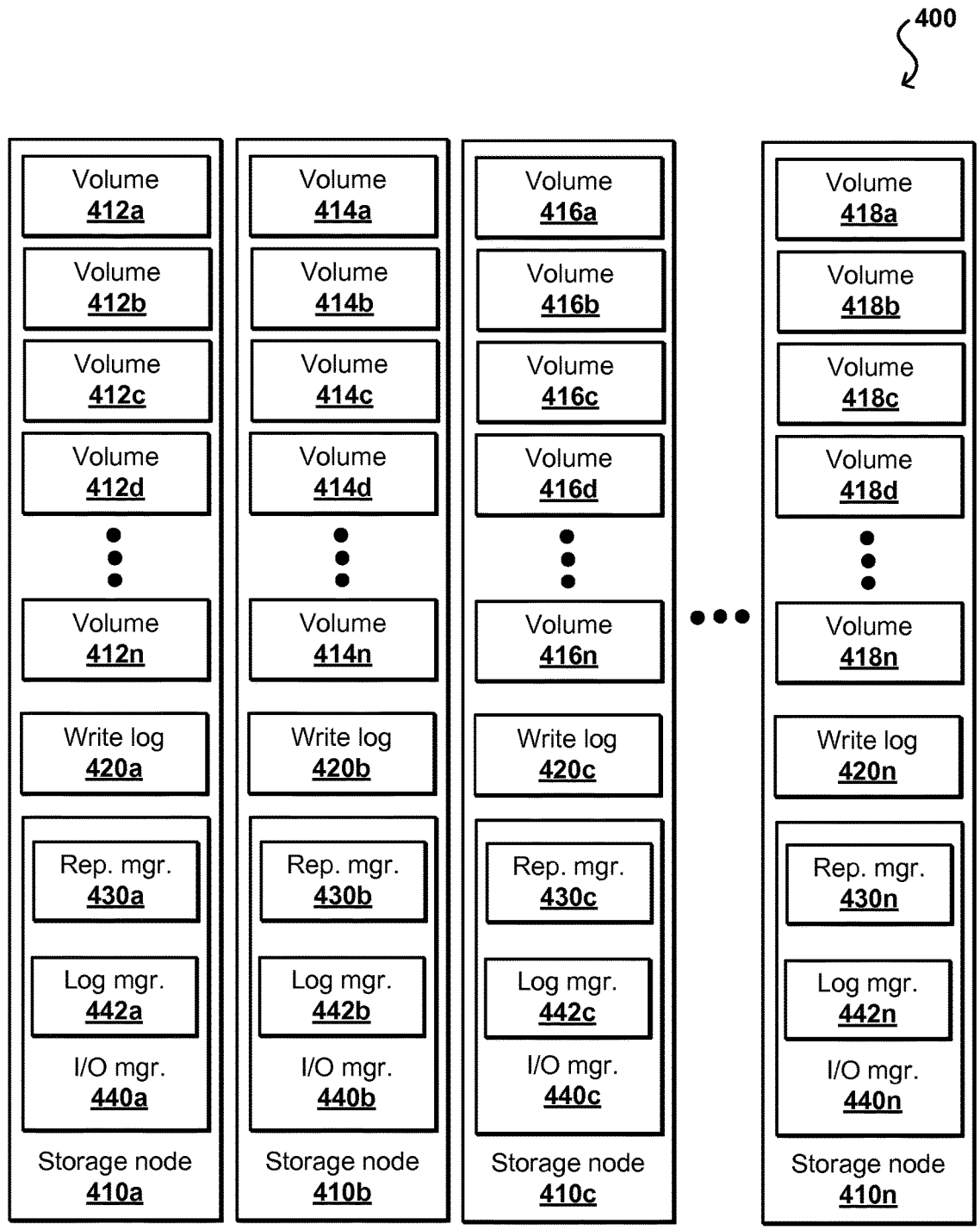
FIG. 4 illustrates a set of storage nodes that can be utilized in accordance with various embodiments.

FIG. 4 is a block diagram 400 illustrating storage nodes that implement write logs for updates to page caches implemented at the storage nodes and dynamically modifying durability properties for data volumes, according to some embodiments. Multiple storage nodes, such as storage nodes 410a, 410b, 410c, through 410n may be implemented in order to provide block-based storage services. A storage node 410 can comprise one or more computing systems or devices, such as a storage server or other such computing system or device. Each storage node 410 can maintain respective replicas of data volumes. For instance, a first storage node 410a maintains a set of data volumes 412, while storage nodes 410b through 410d maintain other data volumes 414, 416, 418, respectively. While the example storage nodes 410 are depicted as having equal numbers of data volumes, numbers of data volumes maintained on storage nodes may vary between storage nodes. Some data volumes may also differ in size from other data volumes, in some embodiments. Storage nodes 410 can be used to provide multi-tenant storage. For example, in some embodiments a data volume 416a maintained at a storage node 410c may be maintained for one account of the block-based storage service, while a different data volume 416b also maintained at the same storage node 410c may be maintained for a different account. Storage nodes 410 can persist their respective data volumes in one or more block-based storage devices (e.g., hard disk drives, solid state drives, etc.) that may be directly attached to a computing system or device implementing the respective storage node.

In various embodiments, storage nodes 410 may each implement at least one respective page cache. A page cache can be a portion of system memory or other memory device that stores pages or other groupings of data from one of the data volumes 412 maintained a respective storage node 410. Instead of directly writing to or reading from a block-based storage device maintaining the portion of requested data of a data volume, the page cache may be updated. For example, if a read request is received for a portion of a data volume, it may first be determined whether the data resides in the page cache. If the data resides in the page cache then the data may be read from cache. If not, the data may be retrieved from the respective block-based storage device maintaining the portion of the requested data of the data volume and written into the page cache for future use. Similarly, a write request directed toward a data volume maintained in persistent block storage may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, the storage nodes 410 can implement respective write logs 420. Page cache write logs, for example, may store log records describing updates to the respective page cache, such as write requests that modify data maintained in a page cache. Thus, in the event of a system or other failure that causes a loss of data in the page cache, log records in the write log 420 can be used to restore the page cache to a state prior to the failure. Log records may be stored sequentially according to the order in which updates are made to the page cache, in some embodiments. By storing log records sequentially, log records may be replayed or re-applied in the order in which they are stored to generate a state of the page cache at a particular point in time. The storage nodes 410 can also implement respective input/output ("I/O") managers 440. The I/O managers 440 may handle I/O requests directed toward data volumes maintained at a particular storage node. Thus, an I/O manager 440*b* can process and handle a write request to a volume 414*b* at a particular storage node 410*b*, for example. An I/O manager 440 can be configured to process I/O requests according to block-based storage service application programming interface (API) and/or other communication protocol(s), such as such as the Internet small computer system interface (iSCSI) protocol. In some embodiments, I/O managers 440 implement respective log management components 442 and replication management components 430. The log management components can perform various log management functions, such as trimming log records and/or performing page cache recovery based, at least in part, on log records. The replication management components can perform various tasks, as discussed herein, related to volume replication.

A block-based storage service can manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 412*a*, a storage node 410*a* may serve as a master storage node. A master storage node may, in various embodiments, receive and process requests (e.g., I/O requests) from clients of the data volume. Thus, storage node 410*a* may then coordinate replication of the I/O requests, such as write requests, or any other changes or modifications to the data volume 412*a* to one or more other storage nodes serving as slave storage nodes. For instance, a storage node 410*c* may maintain a data volume 416*d* which is a replica of another data volume 412*a*. Thus, when a write request is received for the data volume 412*a* at the master storage node 410*a*, the master storage node 410*a* can be configured to forward the write request to the slave storage node 410*c* and wait until the slave storage node 410*c* acknowledges the write request as complete before completing the write request at the storage node 410. Master storage nodes may direct other operations for data volumes, like snapshot operations or other I/O operations (e.g., serving a read request). It should be noted that, in some embodiments, the role of master and slave storage nodes may be assigned per data volume. For example, for a data volume 412*a* maintained at a first storage node 410*a*, that first storage node 410*a* may serve as a master storage node. While for another data volume, such as data volume 412*b*, maintained at storage node 410*a*, the storage node 410*a* may serve as a slave storage node.

In some embodiments, data volumes are replicated with two copies. A replication protocol can be used that can make both copies of a volume deterministically consistent, and that is agnostic to features on the server that use replication for durability like snapshots. This can greatly simplify the replication protocol itself since there can be fewer custom messages, and can allow various other distributed features to be built on a server using replication without ever having to touch the replication protocol.

As mentioned, conventional replication protocols can have problems with inconsistencies between copies. For example, a replication protocol can be inconsistent in certain edge cases, such as in the face of power failure, since much of the data is maintained in memory state. These data inconsistencies can incur operational load to investigate. Further, a conventional replication protocol can require in-depth knowledge of what is being replicated, such that every new feature that wants to use replication needs to change the replication protocol. Approaches in accordance with various embodiments attempt to overcome these and other deficiencies in existing approaches by providing consistency of all copies in all cases. Such a protocol can be agnostic to features using replication, such that there should be no changes to the replication protocol needed to implement a feature such as snapshotting or live migration. Further, such a protocol should not limit future improvements to the replication process, as may involve as prioritized re-mirroring or cross-zone replication.

In various embodiments, data storage volumes can be presented as block devices to customers, addressable via read/write requests using an offset, length, and data. As mentioned, the data volume can be stored on a server as a type of persistent key-value store, such as a B-tree or other log-structured merge tree. In some embodiments, the storage on a server can be divided into portions, such as a log portion and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server, which can store multiple B-trees and associated data. It at least some embodiments the writes first go to the log and then can later be written to the data partition. In some embodiments the B-tree for a volume is stored in the log and the corresponding data, to which the B-tree points, is stored in either the log or the data partition. The B-tree can be stored by writing the nodes of the B-tree to the log and keeping the B-tree structure in memory, such as by using least recently used (LRU) demand paging so that the entire B-tree does not need to fit in memory at one time. To ensure consistency and durability of the data volume and B-tree, any changes to be made to the B-tree can first be sequenced, or tagged with an ever increasing operation number. The intent to change along with the operation number can then be written to the log, the entry in the log regarding the intent being referred to herein as a note. After durably storing the note, the system can commit the change by applying the update to the in-memory B-tree in a sequenced order, which is just an in memory operation. A customer writing to a data volume can then result in changes to the corresponding B-tree structure, which can be recorded as a note. A customer is only able to read the data, however, after the write of that data is committed. The same goes for any other data or metadata stored in the volume, as the data or metadata will be stored via a note only able to be read back after that note has been committed. Since commits are performed in a sequenced order, notes can be written to the log in parallel without worrying about the order in which those notes appear in the log. The system will always guarantee, however, that the changes will be applied according to the sequenced ordering, and not the order in which the changes are written to disk, even after an event such as a power failure. The B-tree for a volume can therefore be reconstructed in memory by replaying all the notes for that B-tree. To speed up recovery after power failure or restart, the B-tree structure can periodically be updated, as a checkpoint or otherwise, to the log.

A note for a customer write operation can contain information such as the offset for the write, the length, the operation number, and the data itself. The volume can map this to a key, value, data-reference store using an appropriate schema. One such schema includes a volume key, which can be a prefix to distinguish customer data, customer offset, and operation number. The schema can also include a volume value, which can refer to the data length, and a volume data reference, which can be a pointer to the location of the data. When a customer write note is committed, a B-tree node can be created based on the offset, length, and operation number in the note. The offset references the logical offset in the data volume, and the data-reference for that node points to the data in the note. The B-tree can then be updated by locating a key with the greatest offset that is less than the offset of the note along with the length. If such a key can be located, a determination is made as to whether the offset and length overlap the note being committed. If not, the node can be inserted as is. If some overlap is detected, the node that was found can be broken apart so that it no longer overlaps, which can mean in some instances that the node is deleted if the new one overlaps it completely. This process can be repeated until no more keys are detected where the offset/length overlap the data to be inserted. The volume storage engine can also support flushing of the data from the log to the appropriate data partition. Notes for customer writes include the data, such that all incoming writes can be written to the log. To free up space in the log (e.g., log space), the storage server can periodically read the data reference and the associated data, write that data to the data partition, and replace the data reference with a pointer to a location on the data partition instead of the log. This enables that data to be removed from the log. This flushing can be performed asynchronously, enabling multiple customer writes to be merged together.

As mentioned, in many instances it will be desirable to replicate various data volumes. A replication process can be responsible for ensuring that both copies of the volume are the same, such as by copying the B-trees and ensuring that all changes done to the B-tree are applied in the same order on each copy. Lincoln Replication tracks these updates to the B-tree as operations. The operations can include, for example, customer writes and metadata updates such as volume provisioned input/output operations per second (IOPS), volume leases, and snapshot metadata. Each operation in at least some embodiments will have an ever-increasing operation number assigned, and the volume can be uniquely described by the sequence of operations. The replication process can guarantee that both copies have the same sequence of operations and will be executed in the same order.

One significant difference between such a replication process and conventional replication processes is that a replication process in accordance with various embodiments can ensure that the B-tree, which represents all metadata and data for a volume, is the same on both copies without knowing anything about what is contained within the B-tree, differences between nodes, etc., whereas legacy replication replicates the metadata and data for a volume, and hence has to have in-depth knowledge of the data. Advantageously, using a replication process in accordance with various embodiments enables anything built on top of the volume using the note and commit model to become a replicated feature for free.

While such a replication ensures that the B-tree structure is the same on both copies, the B-trees themselves may be different with respect to the data references. The keys and the values in the B-trees will be the same, since the data references point to physical offsets in the log or the data partition, and those will generally be different on different hosts. Furthermore, flushing can happen independently on each copy, such that on one copy the B-tree may point to data in the log whereas on the other it can point to the data partition. Between the two copies of a volume, one can be designated as a master copy and the other as a slave copy, where the client will be caused to connect to the master copy. When a volume is initially created, the volume can have a single copy referred to herein as a solo master. A solo master is non-redundant copy of a volume. A slave copy can be created by the solo master as discussed elsewhere herein, and the solo master can start a re-mirroring process, wherein data is copied over to the slave. Once the slave is confirmed to have the same data as the master, the slave is designated as up-to-date or current, which enables the slave to take over and become a master copy if needed. In some embodiments, the communication between a master copy and a slave copy can be based upon a designated protocol, such as a single stream TCP protocol.

The replication process can use the note-commit model of the volumes to guarantee consistency between the maser and slave copies for a volume. Customer writes are recorded as notes, and become readable after the note is committed, with notes and commits occurring on both the master and the slave copy. Once a client write operation is acknowledged, the customer should be able to read the data for read after write consistency, such that a write is only acknowledged in some embodiments if both the master copy and slave copy have recorded the note durably and the master has committed. The slave can only commit up to where the master has committed, and the master will provide information about the current commit point.

In at least one embodiment, the master will generate a note and send a copy of the note to the slave in response to a client write being received, which the slave can acknowledge. When the slave subsequently receives a write from the master, the slave can note the write and respond to the master. When the master receives the response from the slave and its own note has completed, the master can attempt to commit the write. The commit operation has to be performed in operation number order as discussed herein. Once the master has committed the write, the master can send an acknowledgement to the client. Both the master and the slave can track the commit point, which corresponds to the highest operation number that has been committed. When a master forwards an operation to a corresponding slave copy, the master can also forward its commit point to the slave. The slave can then attempt to commit, asynchronously, up to the commit point of the master.

There can be various aspects specified for such a process. For example, each operation noted in the log will have an operation number in at least some embodiments, which will be determined by the master during the note process. The operation number should be unique and ever increasing, and can be provided to the slave from the master. Notes can be out of order, as multiple operations can be noted in parallel, although operations are committed in sequential order. A customer write can be noted on both the master and the slave, if a slave exists, before it is acknowledged to the client. A customer write can also be committed on the master before it is acknowledged to the client, with the slave performing the commit asynchronously.

In various instances, such as when a volume is initially created or a slave copy fails, it can be desirable to provision a new slave copy. When a volume is created initially, the volume will only be on a single server and not be redundant. This initial volume is referred to herein as a solo master volume. Since the volume is not redundant at this point, a process can be initiated to provision a slave copy. Provisioning a new slave copy is done through a process referred to herein as state transfer, where a "state" of a volume refers to a point-in-time copy of the volume. A state of a volume can be comprised of at least two components, including the data structure of the volume and the actual data. State transfer is the process of forwarding both the data structure and the data to the slave copy. The master copy in at least some embodiments is still able to accept client I/O operations during the state transfer.

Figure 5:
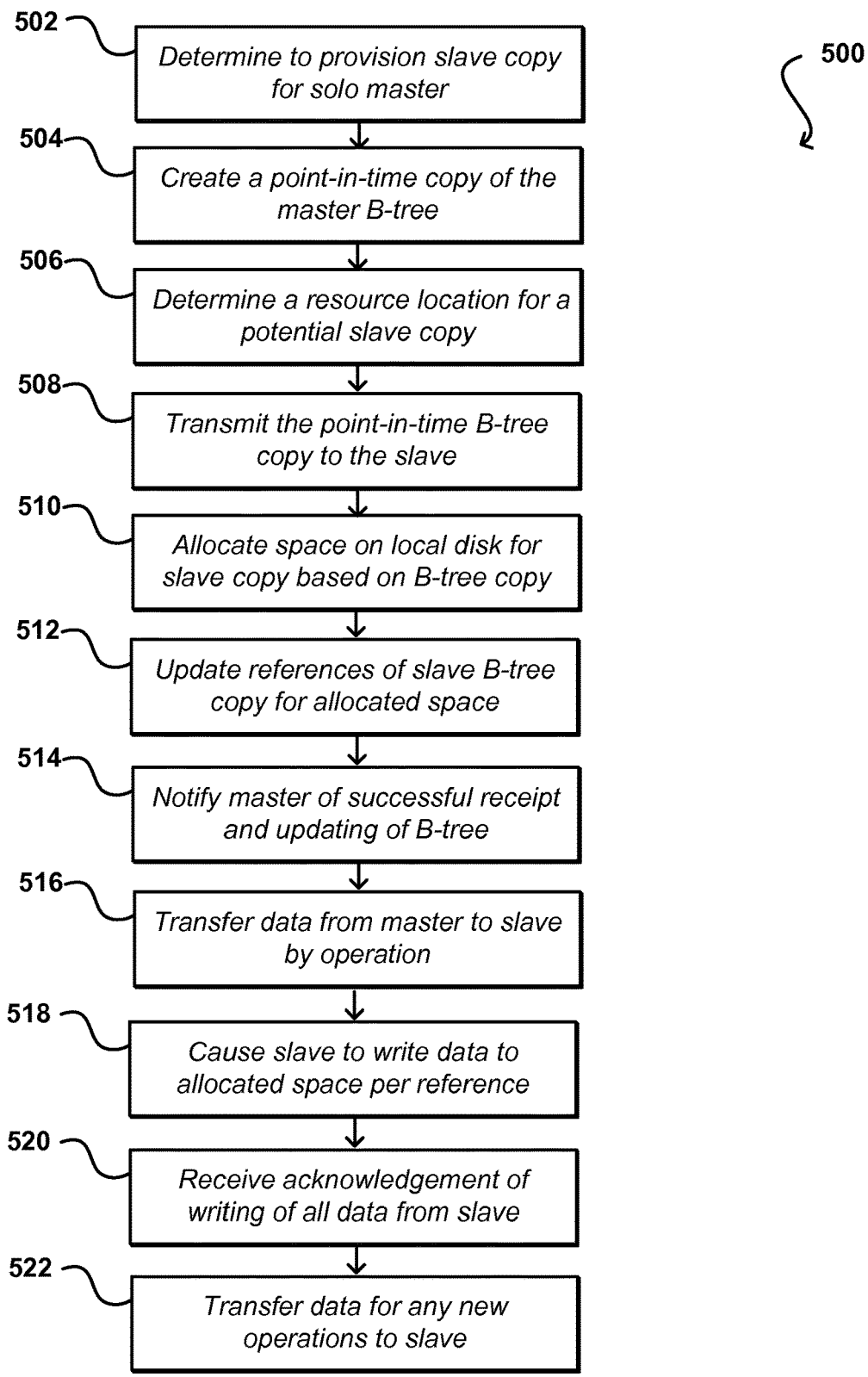
FIG. 5 illustrates a first example process for provisioning a slave copy that can be utilized in accordance with various embodiments.

FIG. 5 illustrates an example process 500 for provisioning a new slave copy that can be utilized in accordance with various embodiments. It should be understood for the various processes described herein that additional, fewer, or alternative steps can be performed in similar or alternative orders, or in parallel, within the scope of the various embodiments unless otherwise stated. In this example, a first step of a state transfer process involves a solo master determining 502 that a slave copy is to be provisioned. The solo master will create 504 a point-in-time copy of the B-tree, or other persistent key-value store, for the volume. This B-tree will contain the appropriate pointers for data stored by the master copy at the time of the creation of the point-in-time copy. Any data obtained or modified after the generation of the point-in-time copy will be managed by the solo master for subsequently being provided to the slave copy. The solo master can determine 506 a location for a potential slave copy, such as may have a sufficient amount of space to store a full copy of the data. As mentioned, in at least some instances a solo master will attempt to find a slave master with slightly more storage space than is needed in order to account for any additional data received during the provisioning process.

The solo master can transmit 508 the point-in-time copy to the determined slave. This point-in-time copy is referred to herein as a B-tree snapshot, and the presence of the point-in-time copy enables modifications to continue to be made to the B-tree of the master for client writes and other such operations. Information can be read from both the point-in-time snapshot of the B-tree and the current B-tree, enabling the solo master to continue noting and committing new operations. The solo master can also save the list of data ranges that need to be replicated to the slave. Any new operations will only happen on the solo master during this stage of the process, and the solo master can subsequently do a catch-up on those operations with respect to the slave copy. The copy operation can involve determining whether there is sufficient space on the slave copy for the data, and the process can abort if there is insufficient space on this particular slave. Another appropriate slave could then be determined. Since it is possible that the size of the master copy grows during the provisioning and the slave can no longer support the size, the process can also be aborted in such situations. Since the copying of the B-tree is relatively fast, however, very little time or effort will be lost in the event the B-tree copy operation fails. In at least some embodiments, more space is initially allocated for the slave copy than is needed in order to allow for some expansion of the data set during the provisioning process. At the completion of this step, the slave copy will have a copy of the B-tree that includes invalid data references for the slave copy (as the pointers point to data locations for the master copy).

Once the slave has a copy of the B-tree, the slave can attempt to fix or update the invalid data references so that the references are appropriate for the slave copy. The slave can read the entire B-tree and allocate 510 an appropriate amount of space on the local disk. The slave copy can then update 512 the references to point to the appropriate locations of the allocated space. The slave will then have a B-tree with valid references for storage locations for the corresponding data, which will otherwise be the same as the point-in-time copy of the B-tree of the master. The slave can acknowledge 514 successful receipt and updating of the B-tree, and can then accept new operations and fill the references with data from master using the information in the B-tree.

As a third step in this example, the slave can write the data for each of the updated references. In this example the master transfers 516 the data to the slave in chunks, or groups of data, over specific data ranges that can correspond to specific operations or operation numbers. As the master reads through the list of data ranges to copy and forwards the corresponding data to the slave, the slave can perform writes 518 for the data received from the master. The master can provide a set of data for a particular operation and indicate the offset for the data, which the slave can use to perform a lookup in the B-tree and determine the location on the disk on the slave side to which to write the data. The master can use the point-in-time copy of the B-tree to ensure that the appropriate data is being provided to the slave. Once all the data is received from the master for the point-in-time B-tree and the slave has written all the data to local disk, an acknowledgement can be received 520 from the slave. The master can also transfer 522 to the slave any data for new operations that were received since the point-in-time copy was created, so that the slave becomes a current and accurate copy of the master.

At the same time that the slave is receiving data from the B-tree snapshot, the slave can also receive new operations from the master in at least some embodiments, which can be noted to the log, committed, and later flushed to the appropriate data partition. There thus can be two sources writing data concurrently to the data partition on the slave. A first source relates to data replicated from the master and referenced by the point-in-time copy of the B-tree. A second source corresponds to the committed operation in the log being flushed to the data partition. These sources could have overlapped offsets and committed operations will have newer data, such that the data transferred from point-in-time B-tree references should not overwrite the committed operation data in at least some embodiments. In order to track which offset has data from flushed operations, the slave copy can create a tracking B-tree, or tracking metadata (i.e., ranges, offsets, and lengths for data) which can be updated each time an operation is flushed to the data partition. When the slave reads data from the master for a certain offset range as part of the state transfer, the slave can query the tracking B-tree and skip copying data for the offset if the tracking B-tree indicates that there is operation flushed for that offset range. The slave can be designated as current, or up-to-date, when the solo master has caused the above steps to be performed and finished forwarding data for any operations that were accumulated during the creation of the slave copy. Once up-to-date, the slave can take over in the event of a failure of the master.

Figure 6:
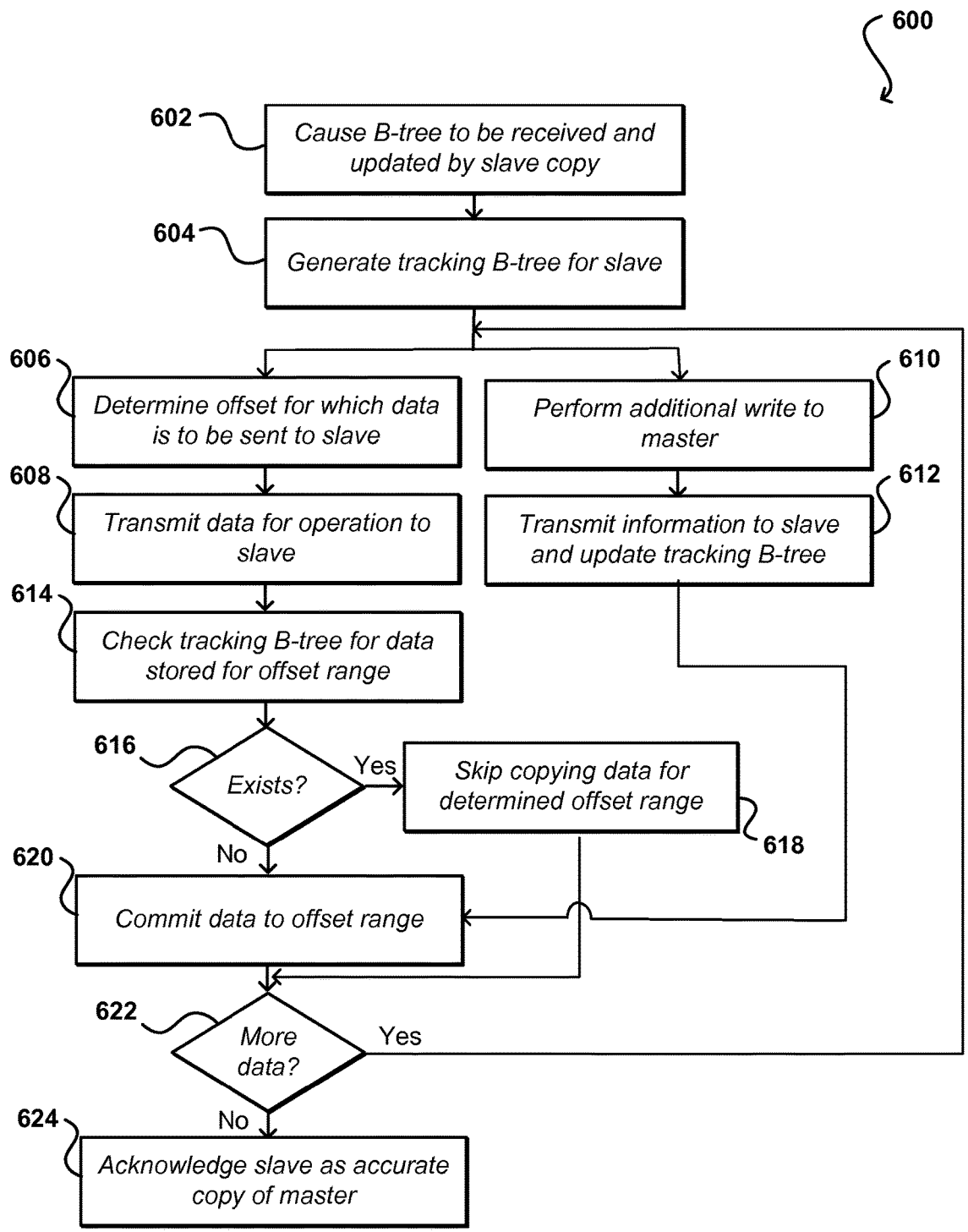
FIG. 6 illustrates a second example process for provisioning a slave copy that can be utilized in accordance with various embodiments.

FIG. 6 illustrates an example process 600 for provisioning a slave copy that allows for concurrent writes from multiple data sources and uses a tracking B-tree to commit only the current data for an offset range, which can be utilized in accordance with various embodiments. In this example, a B-tree snapshot for a master is caused 602 to be received and updated by the slave copy, such as is described with respect to the process of FIG. 5. In this example, the slave is able to receive data for the B-tree as well as information about new writes (or other operations) received to the master since the time the snapshot was generated. In order to keep track of the current data for each offset range, the slave can generate 604 a tracking B-tree that maintains information about data flushed for various offset ranges.

In order to cause the slave to store the data corresponding to the offsets of the B-tree snapshot, the master can determine 606 a next offset for which data is to be sent to the slave and then transmit 608 the corresponding data to the slave. Concurrently, the master may perform 610 additional writes (or deletes, modifications, etc.), committing those writes as appropriate, and transmit 612 information for those writes to the slave, which can cause information for any of those additional writes that are flushed to storage to be added to the tracking B-tree. For any data received from the master, a check can be made 614 against the tracking B-tree to determine whether any data (for a more recent operation) has already been flushed to storage for that particular offset range. If such data is determined to exist 616, the data to be written to that offset range can be skipped 618, discarded, or otherwise managed. If data has not already been flushed for that offset range, the data can be written and committed 620 to that offset range of the local storage for the slave copy. If there is more data 622 to be committed to the slave for either the point-in-time snapshot or more recent operations then the process can continue. Otherwise, the slave can be acknowledged 624 as a current copy of the master and the system can operate under conventional instructions to cause data to be written to the master and replicated to the slave as appropriate.

As described, a first step of such a process only requires transferring the point-in-time B-tree from the master, which generally will be much smaller than the actual data to be copied, such as where a 1 GB volume may have 2 MB B-tree and a 1 TB volume might have 2 GB B-tree to replicate. This enables the slave to quickly determine whether adequate space is available for the data, and allocate that data as necessary, before the data transfer begins. If the provisioning of the slave needs to be cancelled or rolled back, for example, the determination can be made quickly with minimal unnecessary data transfer or delay. Further, fixing the references in the slave B-tree does not involve any data transfer and is all local to the slave, such that the entire process of creating and updating the tree can take a few minutes or less in at least some embodiments. This also minimizes the amount of data for new writes that must be stored during the provisioning process, which conserves resources and reduces the likelihood of an event that can cause inconsistencies between the copies, such as power failures or other such events.

For the provisioning of a new slave, the state transfer is bounded such that when the B-tree, and all the data references by the B-tree, is transferred then the state transfer is done. During the whole process of state transfer, the solo master can note and commit operations. Once the B-tree is transferred and the references are fixed, the slave copy can note, commit, and flush operations. State transfer can be resumed after a network disconnect, but will have to be restarted if either of the peers crashes or loses power. State transfer is necessary if a master is re-mirroring to a brand new copy in at least some embodiments. If a master is reconnecting back to an old slave that has partial data, the master can perform catch-up replication, which is a special kind of replication that should be faster than a full state transfer because the solo master only needs to replicate the operations that it receives during the time that it is not connected to the slave.

In at least some embodiments a most recent copy of the B-tree snapshot, or point-in-time copy, can be retained along with the current copy. In the event that a key is deleted from the B-tree, a new entry can be added in the new space that indicates the key was deleted. This entry indicates that the key is still available from the prior version if needed.

Figure 7:
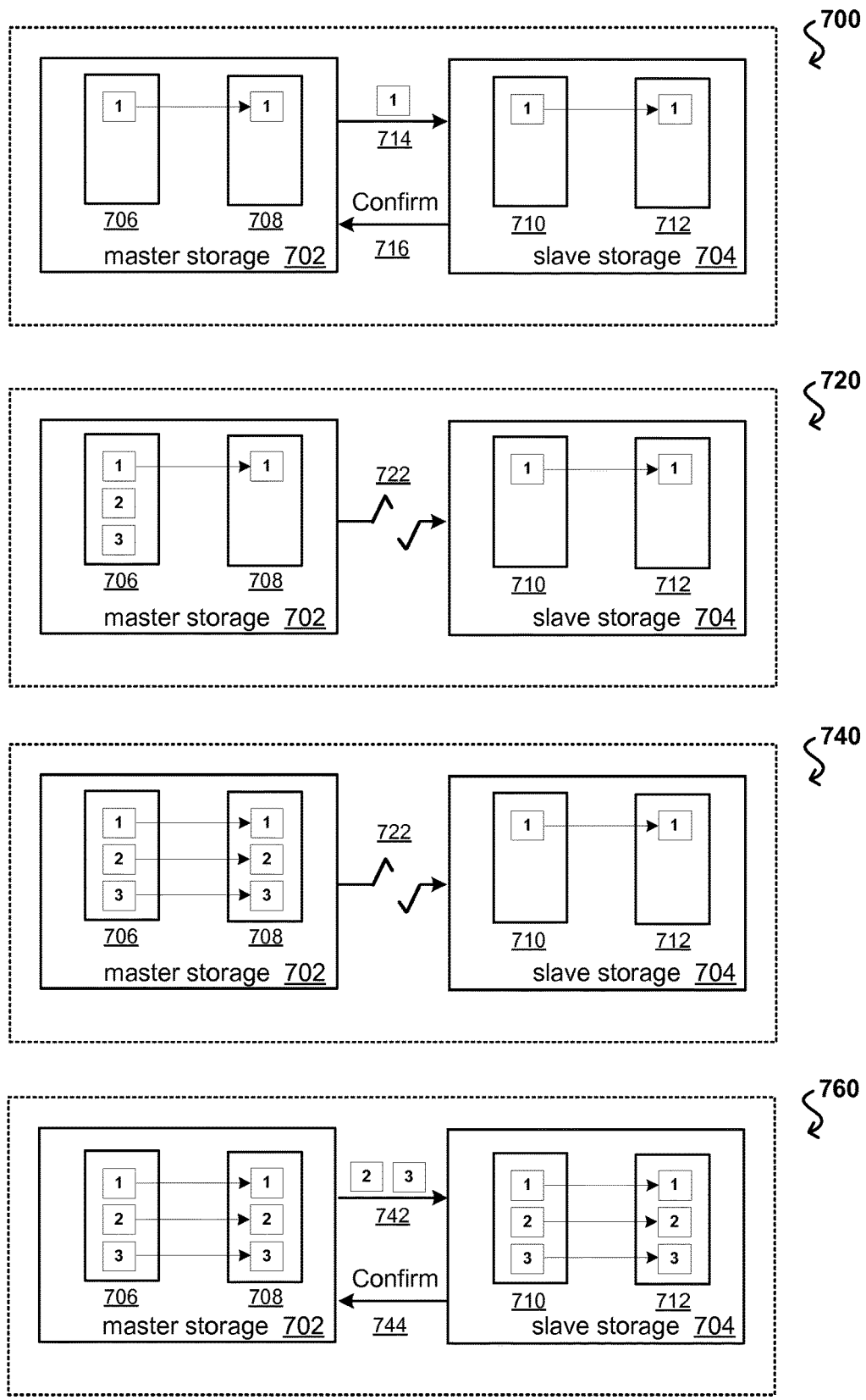
FIG. 7 illustrates a series of block diagrams demonstrating an example process of a slave acting as a redundant copy of the master that can be utilized in accordance with various embodiments.

FIG. 7 illustrates a series of block diagrams demonstrating an example process of a slave acting as a redundant copy of the master that can be utilized in accordance with various embodiments. In this example, a master 702 and a slave 704 are provided wherein the slave begins as a provisioned and an up-to-date copy of the master, and the slave is acting as a redundant copy of the master. According to various embodiments, the master 702 and the slave 704 may each be examples of data volumes, such as data volumes 412a, 412b, 412c, through 412n as in FIG. 4, and may be maintained on the same or different storage nodes, as discussed with reference to FIG. 4. In the example of FIG. 7, each of the master 706 and slave 708 volumes have a respective log partition 706, 710 and data partition 708, 712, as described with reference to FIG. 4, where for example writes may be noted in a log partition before being committed to a data partition, although as described earlier, different types of configurations and operations are envisioned. As mentioned, in the example of FIG. 7, the slave 704 begins as an up-to-date copy of the master 706. In the first situation 700 of FIG. 7, the master has received a new write operation, which is tagged with the operation number 1 and noted at the log partition 706 of the master 702, as described earlier. The operation is forwarded 714 to the slave 704, where it is noted in the log partition 710 and committed in the data partition 712, and a confirmation is sent 716 to the master. The new write operations can first be noted by the slave before being committed by the master (then later asynchronously committed by the slave) in at least some embodiments, in order to ensure redundancy of the data (and metadata, which can be treated similarly for redundancy purposes). In some embodiments, the write can be noted on the master, then committed on the master after the write is noted and committed on the slave. In any event, the master may note and/or commit before the slave or vice versa in various embodiments. Even though one will act as the master and the other the slave, the volumes will function as redundant peers, both of which are capable of performing as a master volume if needed.

It may be the case that there is a network event or other occurrence that causes a disconnect between the master and the slave. For very short disconnections, this may not cause any significant problems or require any changes, particularly where a check shows that no write operations or commits were received and/or dropped by either redundant peer. If the peers were to continue as master and slave under a conventional approach, no new writes could be committed during the disconnect because the slave would be unable to commit before the master, which then would be unable to confirm the commit.

Accordingly, approaches in accordance with various embodiments can attempt to cause one (or both) of the redundant peers to operate as what is referred to herein as a solo master, discussed briefly above. A solo master will function as if a redundant peer does not exist, in at least some embodiments, and can accept client I/O that the solo master can commit on its own. The solo master can continue to accept and commit client I/O until able to reconnect to the peer, at which point a catch-up replication process can be initiated. During the catch-up replication process, the solo master (or a selected solo master if both slave and master acted as a solo) can attempt to replicate all the operations that were received during the period of disconnection. Further, for any new I/O received after the connection is re-established, the master can operate per normal commit procedure, in this case sending information for the new operation to the slave before committing those new operations. As described earlier, each operation to be replicated, as well as each new operation, will have an unique and increasing operation number assigned to it, such that each operation to be committed at the slave will be committed in accordance with the corresponding operation number. In this manner, the writes to the slave will be performed in the order at which they were performed at the master, thus ensuring redundancy and preventing newer data (e.g., having a higher operation number) being overwritten at the slave with older data (e.g., having a lower operation number). Once the master and slave are caught up, the pair can again operate as fully redundant peers.

In the second situation 720 of FIG. 7, a disconnection 722 between the master 702 and slave 704 is detected, which as mentioned above, would result in no new writes being committed during the disconnect 722 under conventional approaches. As a result of sensing the disconnect 722, the master 702 operates as a solo master and receives two new write operations, which are noted in the log partition 706 and tagged with operation numbers 2 and 3, respectively. Proceeding to the third situation 740 of FIG. 7, the disconnect 722 is still in existence, so the master, operating as a solo master, commits operation number 2 and 3 in the data partition 708. In the fourth situation 760 of FIG. 7, the master 702 and slave 704 are once again connected, and as part of the catch-up replication process, the master forwards operations above the highest operation number that was previously committed at the slave 704, which in this example is 1. Therefore, operation number 2 and 3 are forwarded 742 to the slave, which notes the operations in the log partition 710 and commits the operations in the data partition 712, after which a confirmation is sent 744 to the master. As described above, the order of the slave noting and committing the operations may vary with relation to the master. As the master 702 and slave 704 are now caught up, they again operate as fully redundant peers.

Figure 8A:
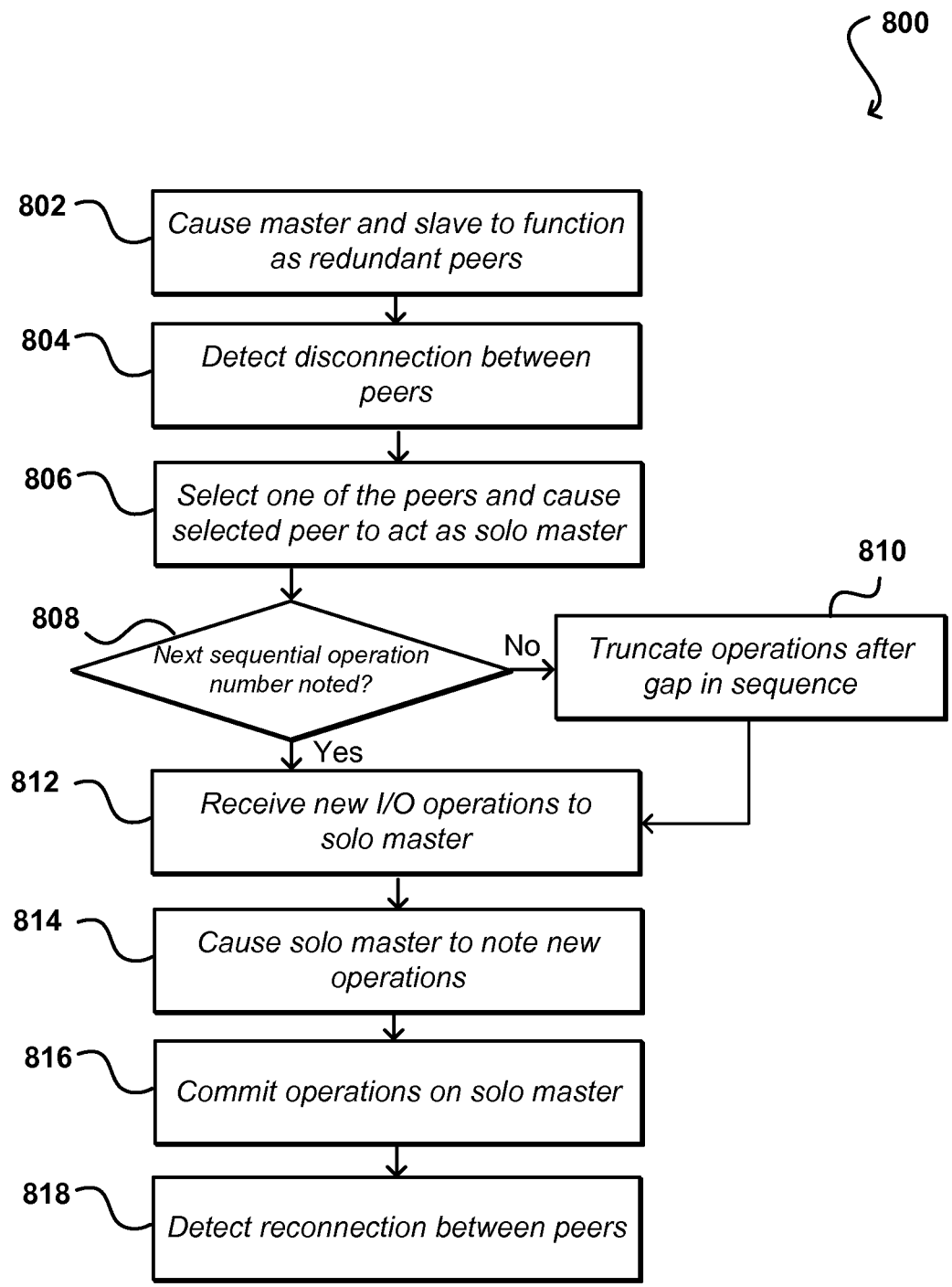
FIGS. 8A and 8B illustrate portions of an example process for performing catch-up replication that can be utilized in accordance with various embodiments.

FIG. 8A illustrates a first portion 800 of an example process for catch-up replication of a redundant peer that can be utilized in accordance with various embodiments. In this example, a master storage volume and a slave storage volume are caused to act 802 as redundant peers at least for the purposes of client I/O, such that I/O received at the master storage volume is replicated to the slave storage volume. During operation, a disconnection between the peers is detected 804. The disconnection can occur for any of a variety of reasons, such as one of the peers becoming unavailable, a network connection being dropped, a power failure, etc. In response, one of the peers can be caused 806 to operate as a solo master. The decision in this example can be made based upon, for example, which peer is available to receive client I/O. If both are able to receive client I/O but are unable to communicate with each other for some reason, the master can be designated to operate as the solo master, although as mentioned in other embodiments both can operate as a solo master in order to attempt to avoid data loss.

A determination is made 808 as to whether the information for the next sequential operation number is noted. If the information for the next sequential operation number is not there, such that there is a gap in the sequence caused by for example, an error in the input/output stream, a power interruption, or other event, any noted operations after that gap can be truncated 810 (e.g., deleted) or otherwise not committed. The truncation is used in the presence of any gaps, in this example, in order to ensure data accuracy and integrity, as the peer caused to operate as a solo master has no way of knowing whether the other peer had committed operations corresponding to the gap, in what order or location, etc. The storage volume functioning as the solo master can then receive 812 client I/O, such as a customer write operation during the disconnect period. The solo master can note 814 the operation as discussed above, as notes can be generated concurrently or out of order but the operation numbers need to be performed sequentially. The data for that operation number can be committed 816 to the solo master. This process can continue until a reconnection is detected 818 between the master and slave peers.

Figure 8B:
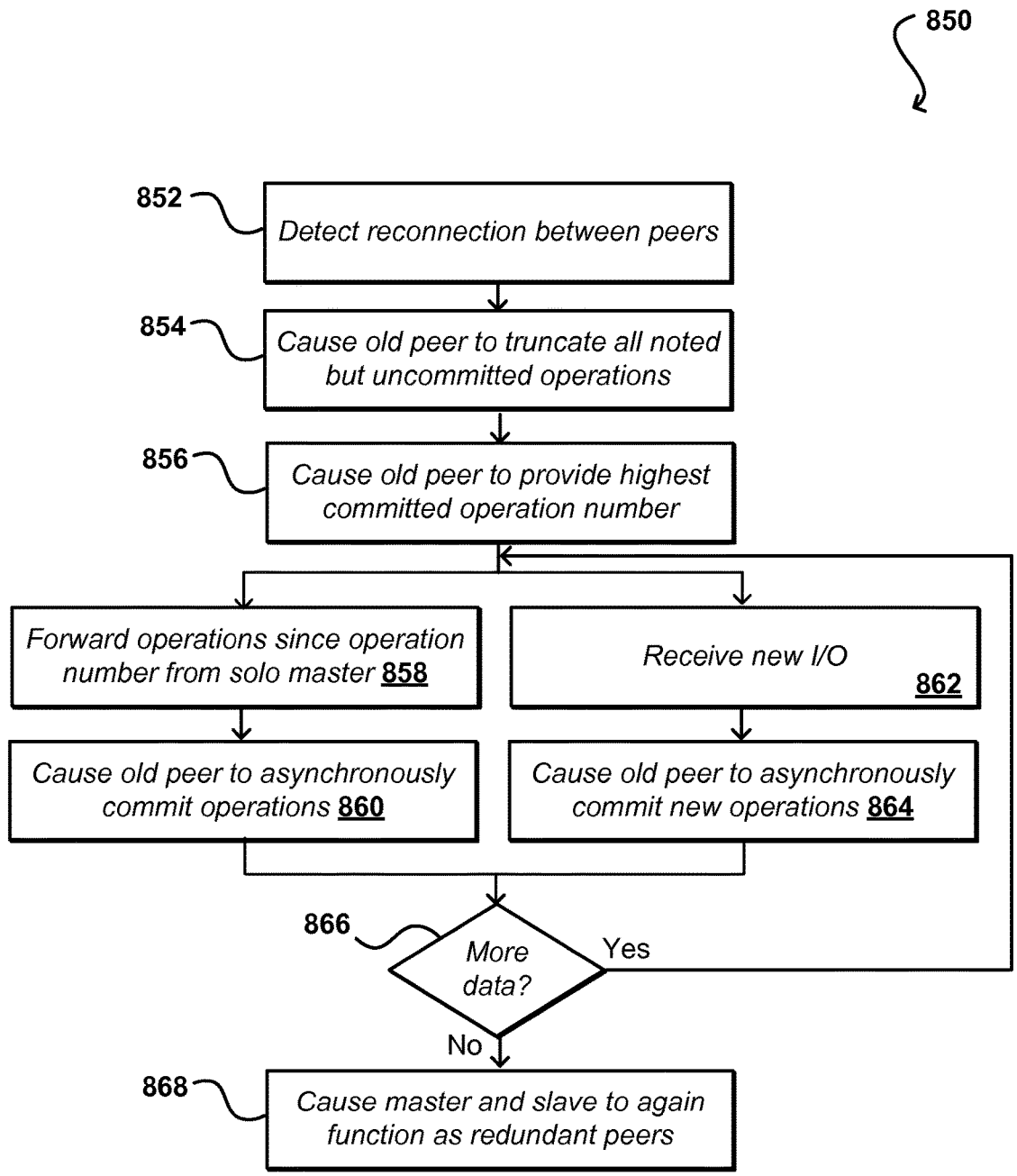

FIG. 8B illustrates a second portion 850 of the example process. In this example, a reconnection is detected 852 between the redundant peers. Upon the reconnect, the old peer can truncate 854 all operations that were noted by the peer but not committed before the disconnect action occurred. Because the operations were not committed by the slave and acknowledged by the master, for example, the noted operations cannot be committed by the slave because there is no way of knowing, without additional information, whether the operation was also committed by the master, or in what order or location, etc. The slave volume (or other old peer) can also provide 856 information regarding the highest sequential operation number that was committed by the slave. This information enables the master to determine the point to which the slave was up to date before the disconnect action. The timing of the disconnect will not be sufficient, as there may have been some delay in detecting the disconnect and the master may be unable to readily determine which of the operations noted before the disconnect action were actually committed. Further, the slave may have committed an operation before the disconnect action but was unable to report the committing to the master due to the disconnect action.

After receiving the operation number for the last commit performed by the slave, the solo master can begin the catch-up replication process by forwarding 858 information for all operation numbers higher than the catch-up point of the slave. The slave can asynchronously commit 860 the operations based upon the commit point of the master storage volume. Concurrently, a new I/O operation can be received 862 by the master, which can cause 864 information for the new operation to be forwarded to, and noted and committed by, the slave. The slave can notify the master that the data has been committed, whereby the master can also commit the data for the operation. If there is more data to be committed 866, the process can continue. Else, the solo master can be caused 868 to again operate as a redundant master volume and wait for the slave volume to commit data for an operation before committing the data for that operation via the slave volume, etc.

As mentioned, when a disconnect occurs between a master and an up-to-date slave in at least some embodiments, both can attempt to become a solo master. In at least some embodiments one of those storage volumes will be selected as the solo master. This may result in the prior slave volume becoming the new solo master volume. The recovery process can be the same as described previously, regardless of whether the old master or the old slave is selected as the new master. The new master will try to reconnect back to the old peer and synchronize with the old peer before accepting new operations. The volume can remain dual redundant during this process.

Figure 9:
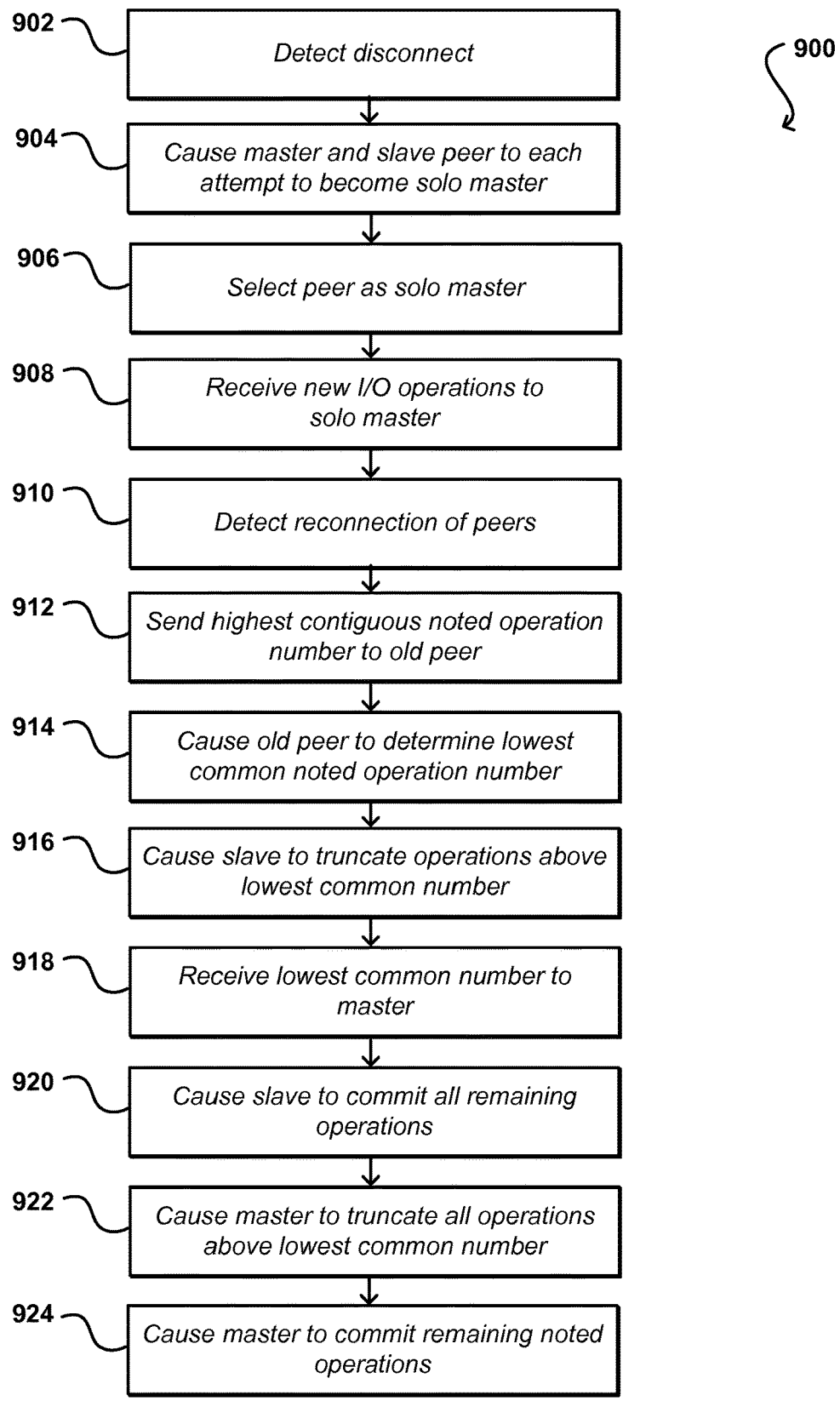
FIG. 9 illustrates an example process for synchronizing data among peers that can be utilized in accordance with various embodiments.

FIG. 9 illustrates an example process 900 for synchronizing data among peers that can be utilized in accordance with various embodiments. In this example, a disconnect action occurs 902 and both the slave and master volume attempt 904 to become a solo master. One of the master and slave peers is selected 906 as the solo master, after which the solo master receives 908 data for any new client operations. Eventually the peers are able to reconnect 910. The new master can send 912 its highest contiguous noted operation number to the other peer, which now operates as the slave peer. When the new slave receives the highest contiguous noted operation number from the master, the slave will determine 914 the lowest operation number between the highest contiguous noted operation number of the master and the slave, and can truncate 916 all operations with operation numbers above that lowest common operation number. The slave can then provide 918 the common operation number to the master, and can commit 920 all the remaining noted operations. When the master receives the highest noted operation number from the slave, the master will also truncate 922 all the noted operations that are higher than the lowest common operation number, and will commit 924 all the remaining noted operations, such that the master and the slave are synchronized and the master is ready to accept new operations.

The process to recover from such an event should be the same in at least some embodiments, whether the event is a power failure, server crash, or hot-restart, among other such types of events. One of the peers will become solo master and commit all the operations up to a gap in the operation numbers where the operation numbers are no longer continuous. All noted operations after the gap can be deleted. Since replication processes discussed herein guarantee consistency between the master and the slave, the solo master can reconnect back to the old peer after reconnection and initiate the catch-up procedure.

As mentioned, a disconnect action can occur when the master is replicating to a slave either as a new copy or when catching up with an old copy. When a disconnect occurs, the master will try to reconnect with the slave and continue the replication. For state transfer, the master can continue the state transfer and forward any new operations to the slave after the state was created. For catch-up replication, the master can reconnect and obtain the commit point of the slave, which could be higher than the previous commit point, and start to catch-up again. A master cannot keep all the operations on the log forever, such that after an operation is committed the operation can be "garbage collected." When the master tries to do catch-up replication with a slave, the master may not have all the operations on the log to replicate to the slave. In such an instance, the master can perform a state transfer instead of catch-up replication. The lack of operational information or data can be addressed in at least some embodiments by locating a third copy that contains the missing information. This can include a prior peer volume or a peer created to store newly received operation data, among other such options.

In some embodiments, the creation of a solo master in the event of a disconnect or other such event can trigger the creation of a third storage volume, referred to herein as a "zippering" peer. A zippering peer can store information for operations received while the master is operating as a solo master. A volume zippering process enables a partial copy, or a portion of the information, to be read from a zippering peer and merged with the data from the solo master in order to generate the full set of operations and/or information needed to replicate a current re-mirroring peer (e.g., a peer to which a copy of a master is being made). If available, the zippering peer can be one of the old peers for the volume that may or may not be out of date, but would contain at least some of the same data. Zippering volumes can be used in some systems to obtain data where the master might experience a disk error but the affected data can be retrieved from the zippering volume. The master can then store the data as needed and cause that data to be replicated to its current peer.

Approaches in accordance with various embodiments can also enable a master volume to read from a zippering peer and, if successful, replicate the data to the current slave or redundant peer. Such an approach can help to improve catch-up replication in at least some embodiments. One potential issue with catch-up replication is that the solo master in at least some embodiments will need to maintain information for all the newly received operations in a log partition, for example, until such time as the solo is reconnected to the redundant peer and able to have the information transmitted to the redundant peer. Otherwise, upon a reconnection a full state transfer would need to be performed instead of a much faster catch-up replication because the catch-up data will no longer be available in the log partition.

Figure 10:
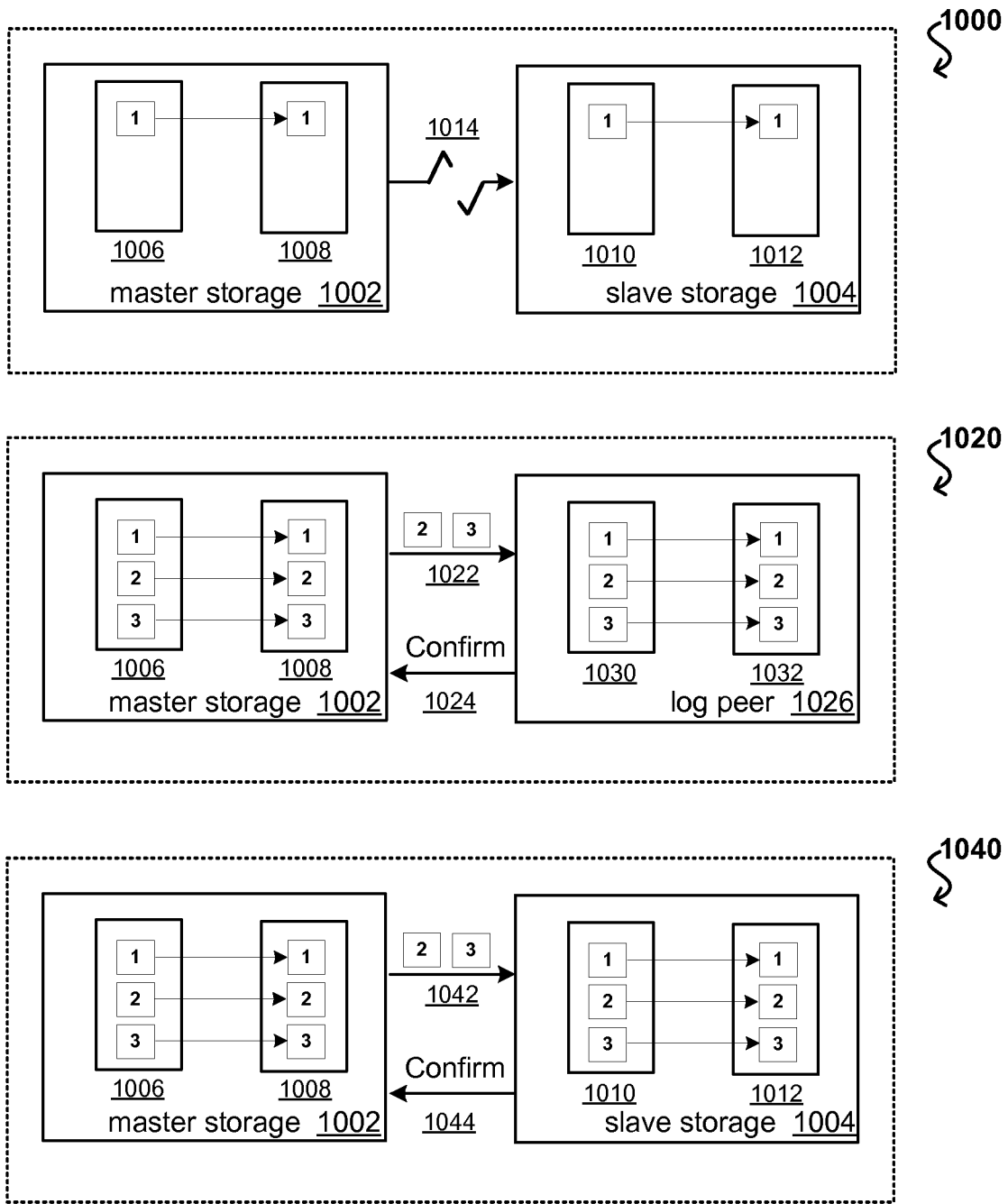
FIG. 10 illustrates a series of block diagrams demonstrating an example process of provisioning a log peer that can be utilized in accordance with various embodiments.

Similar to a zippering peer, the solo master can provision a log peer which is dedicated to storing information for operations that may be needed for future catch-up replication. The solo master can attempt to provision a log peer immediately after becoming a solo master, for example, and notify the control plane about the log peer. The control plane can record (or at least store in memory) information identifying the log peer, together with identifying information for the master and the slave for a volume. FIG. 10 illustrates a series of block diagrams demonstrating an example process of a provisioning a log peer that can be utilized in accordance with various embodiments. In this example, a master 1002 and a slave 1004 are provided wherein the slave begins as a provisioned and an up-to-date copy of the master, and the slave is acting as a redundant copy of the master. According to various embodiments, the master 1002 and the slave 1004 may each be examples of data volumes, such as data volumes 412a, 412b, 412c, through 412n as in FIG. 4, and may be maintained on the same or different storage nodes, as discussed with reference to FIG. 4. In the example of FIG. 10, each of the master 1006 and slave 1008 volumes have a respective log partition 1006, 1010 and data partition 1008, 1012, as described with reference to FIG. 4, where for example writes may be noted in a log partition before being committed to a data partition, although as described earlier, different types of configurations and operations are envisioned. As mentioned, in the example of FIG. 10, the slave 1004 begins as an up-to-date copy of the master 1006. In the first situation 1000 of FIG. 10, a disconnection 1014 between the master 1002 and slave 1004 is detected. A current commit point for the master 1002 is determined, which in this example corresponds to the highest operation number committed at the master 1002, which in this example is the operation number 1 in FIG. 10. As described further herein, the current commit point may be determined in various other and/or additional ways. In the second situation 1020 of FIG. 10, as a result of sensing the disconnect 1014, the master 1002 (now a "solo master") initiates the provisioning of a log peer 1026. When the solo master 1002 is connected with a log peer 1026, the solo master can forward 1022 all the operations it has received since becoming a solo master, which in this example situation 1020 correspond to operation numbers 2 and 3, and can follow a note-commit model for incoming operations with the log peer 1026 as discussed herein, including the log peer 1026 confirming 1024 the operations. In this way, the log peer 1026 can handle operation and act much like a temporary slave, since the original slave 1004 is no longer connected. The log peer 1026 can note the operations the solo master forwards, for example in a log partition 1030, then flush the operations to the disk without attempting to commit them, although in various embodiments, the log peer 1026 may commit the operations, for example to a data partition 1032 or other storage. The solo master 1002 can start to garbage collect the committed operations that have been noted on the log peer. Later, as illustrated in the third situation 1040 of FIG. 10, when the solo master 1002 manages to reconnect with its old peer (e.g., the original slave 1004), the solo master 1002 can determine the lowest operation number (in this example, 1) that both the master 1002 and slave 1004 have committed, and based on that can begin forwarding operations 1042 to the slave that have a higher operation number, which the slave 1004 may confirm 1044 as described herein. In other embodiments, the solo master 1002 can read from the log peer for an operation that has been garbage collected on itself but is needed for catch-up replication. In addition, when the solo master reconnects with its old slave, the log peer can send its data to the old slave or become a new slave depending on a variety of circumstances discussed further herein, for example if the master has been disconnected for so long that the log peer has more data than the old slave.

Figure 11A:
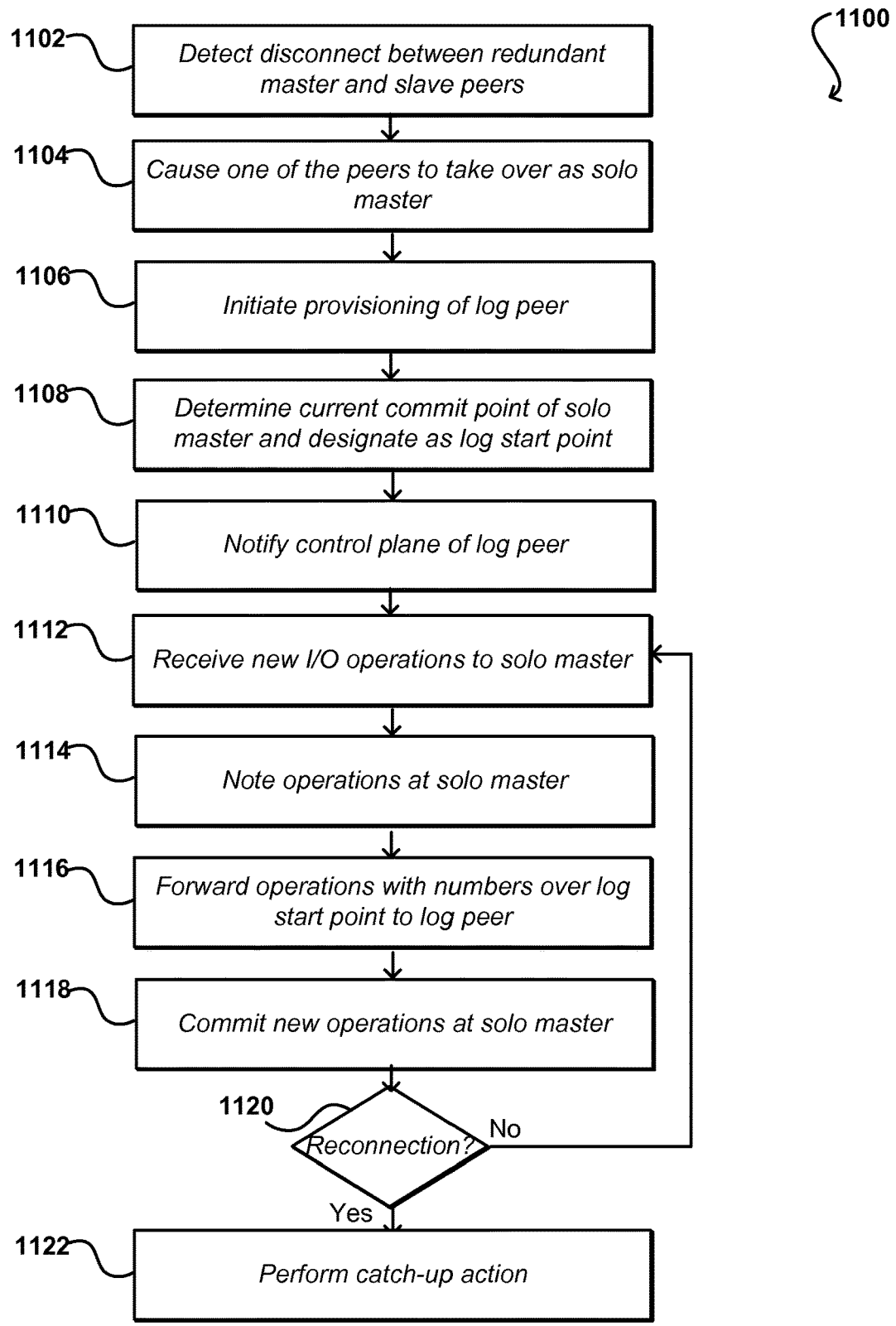
FIGS. 11A, 11B, and 11C illustrate portions of an example process for performing catch-up replication with a log peer that can be utilized in accordance with various embodiments.

FIG. 11A illustrates an example catch-up process 1100 involving a log peer that can be utilized in accordance with various embodiments. In this example, a disconnect action is detected 1102 between a master peer and a slave peer. As discussed above with respect to other methods, one of the peers will take over 1104 as the solo master. The solo master can initiate 1106 the provisioning of a log peer, or otherwise contact an existing peer if one is already available for the solo master. In some embodiments the log peer is only provisioned if an I/O operation is received while the peer is operating as a solo master. The solo master can determine 1108 its current commit point, and designate that as a starting point for the log peer, such that all operations with an operation number higher than the starting point will need to be forwarded to the log peer, at least until the solo master again has a redundant peer and no longer needs to utilize the log peer for newly received I/O. When determining the commit point, the solo master can commit all noted operations until a gap is detected between operation numbers, if any, after which operations with operation numbers higher than the gap can be truncated. In at least some embodiments, the solo master can also notify 1110 the control plane, or another appropriate system or component, of the log peer, whether upon provisioning, upon being synchronized with the solo master, or at any other appropriate time.

Figure 11B:
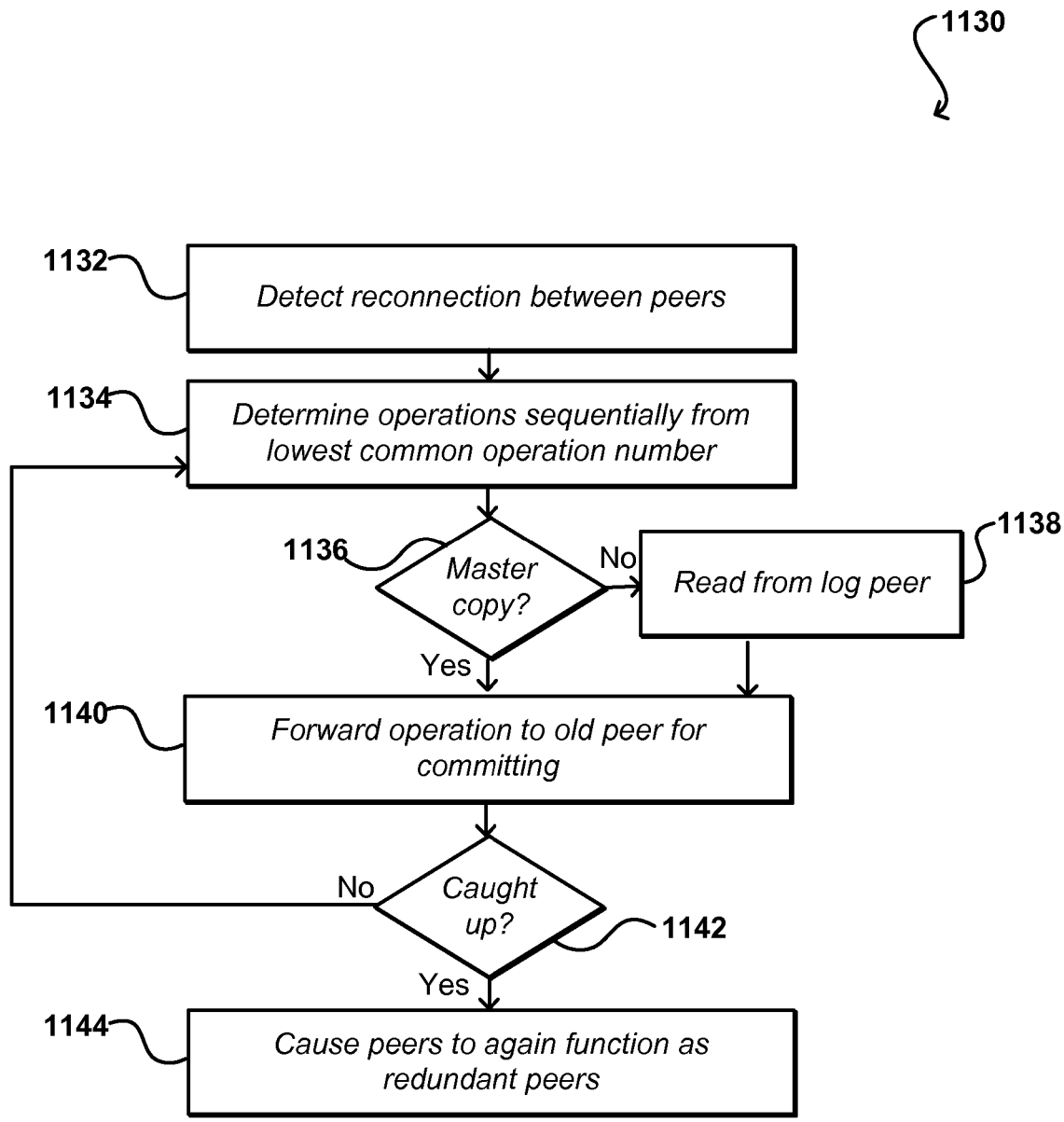

After one of the peers is dedicated as a solo master and a log peer has been designated, the solo master is ready to accept new client I/O. The solo master can receive 1112 a new I/O operation and note 1114 the operation, such as to the log partition of the solo master. Concurrently with receiving, noting, and committing new I/O, the solo master can forward 1116 all operations with operation numbers higher than the log peer start point to the log peer, whereby the log peer can note and commit or flush the data for the operations as appropriate. After the log peer acknowledges the operation data, the master can attempt to commit 1118 the new operation to the data partition. The solo master does not first wait to commit until the log peer commits, as with embodiments wherein the master waits to commit until the slave peer commits, although in various embodiments wherein the log peer attempts to commit operations, the solo master may wait until that process is confirmed. As the solo master is performing these actions, the solo master can attempt to reconnect to the old slave peer. If a reconnection between the solo master and slave peer occurs 1120, a catch-up action can be performed 1122 such as is illustrated in FIG. 11B. If not, then the solo master can continue operations. If a new I/O write is received then the solo master can continue to note and commit the operations, while forwarding the operations to the log peer.

FIG. 11B illustrates a second portion 1130 of the process wherein catch-up replication is performed that can be utilized in accordance with various embodiments. In this example, a reconnection is detected 1132 between the solo master and the former slave peer. As mentioned previously, the master can determine 1134 the lowest operation number that both the master and slave have committed, and based on that can begin forwarding operations to the slave that have a higher operation number. First, the master can determine 1136 whether the master has a copy of the operation in its log. If not, the master can contact the log peer and read 1138 the operation data from the log peer. Once the master either has the operation data or obtains the data from the log peer, the master can forward 1140 the data to the slave peer, whereby the slave can note and commit the operation. A determination can be made 1142 as to whether the slave is caught up, such as whether the master has received acknowledgements of all operations up to the current operation number. If not, the process can continue with the master sending catch-up operation data to the slave peer. Once the slave peer is caught up, the master can slave can be caused 1144 to again act as redundant peers, with operations received to the dual redundant master peer being sent to the slave peer and committed by the slave before being committed by the master peer, among other such options.

A log peer in many embodiments will be a partial copy of a data volume, which is synchronized with the solo master volume, at least for new operations, while the master peer is functioning as a solo master. Having a log peer in at least some embodiments enables catch-up replication to be performed without the risk of running out of log space for the master or otherwise. When the solo master reconnects back to its old peer, the master in at least some embodiments can choose between state transfer and catch-up replication for the slave peer in order to use the more efficient option. This determination can be made in part by comparing, for example, size of the log peer to the size of the overall volume. If the log peer has more current data than the old slave peer, a new provisioning or state transfer process may be more efficient, where state transfer can be used as discussed above with respect to various embodiments. In some embodiments, the log peer can alternatively become the new slave peer if it would be more efficient, and the log peer has the appropriate size and/or capabilities, for the log peer to become the new slave.

Figure 11C:
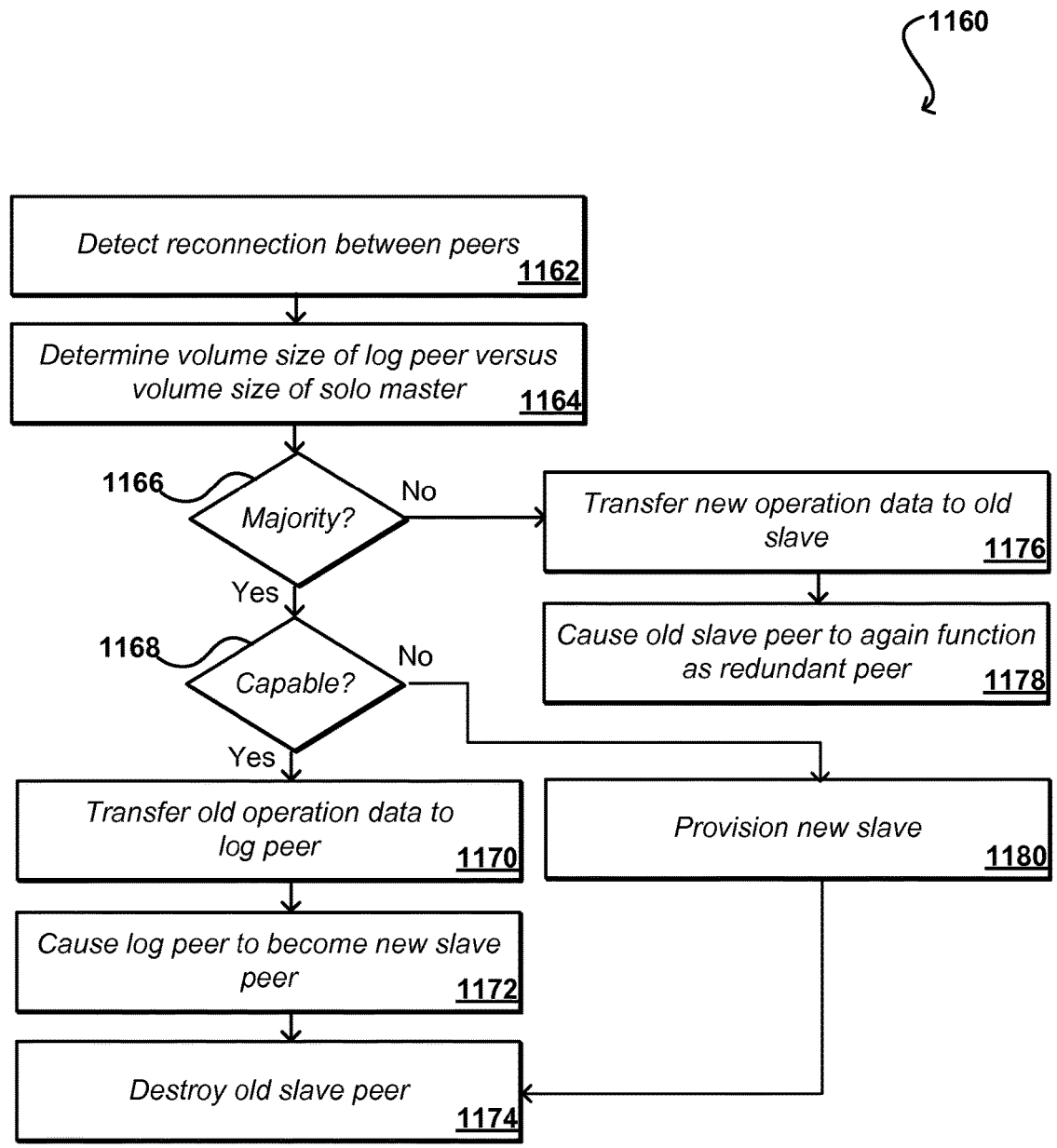

FIG. 11C illustrates an example portion 1160 of the process that can be utilized in accordance with various embodiments to determine the most efficient and/or appropriate catch-up option. In this example, a reconnect action is detected 1162 between the solo master and the old slave peer. The size of the log peer can be compared 1164 with the overall volume size to determine how much of the current volume data and/or operation data is held by the log peer. A determination can be made 1166 as to whether the log peer contains a majority (or some threshold amount such as at least 60% or at least 70%) of the data. If so, it may be more efficient for the log peer to become the new slave. Other factors may be considered alternatively, or in addition, as well within the scope of various embodiments. For example, a determination involving cost, efficiency, location, user preference, and other factors can be used to evaluate whether the log peer should become the new slave. Another determination can be made 1168 as to whether the log peer is capable of functioning as a redundant peer, such as whether the log peer has sufficient storage capacity for the entire volume. If so, then the old operation data can be transferred 1170 to the log peer and the log peer, when up to date, can be caused 1172 to become the redundant slave peer. The old slave peer can then be destroyed 1174 or otherwise handled. If the log peer is not capable of functioning as the slave peer, but the log has a majority of the data for the volume, then a full state transfer action can be initiated to provision a new slave 1180 as discussed above, after which the old slave peer can be destroyed, etc. Alternatively, the new operations can also be sent to the old slave peer. If the log peer did not store a majority of the volume data, or meet another such threshold or criterion, the new operation data can be transferred 1178 to the old slave, such as by using the process of FIG. 11B, after which the old slave can be caused 1178 to again operate as a redundant slave peer.

In an instance where the solo master dies, or otherwise malfunctions or become unavailable, while acting as a solo master, the log peer and old slave peer can work together to form a valid copy. The old slave peer will have all the data up to the start point for the log peer, and the log peer will have all the data committed since the start point, such that the operations of the log peer can be performed on the data of the slave, for example, in order to form a peer with a full data set, which can then become the new master peer. The new master peer can then provision a new slave peer by doing a full state transfer or bringing one of the other peers up to date, as discussed elsewhere herein. In some embodiments, multiple slave copies can be maintained, where each slave can be a full or partial copy. This can help to, for example, maintain copies of old data without maintaining all that data in current copies, etc. Additional slaves can be used advantageously for other reasons as well, such as to have replicas in different geographical regions or other such locations which provide fault tolerance in addition to redundancy, etc.

Figure 12:
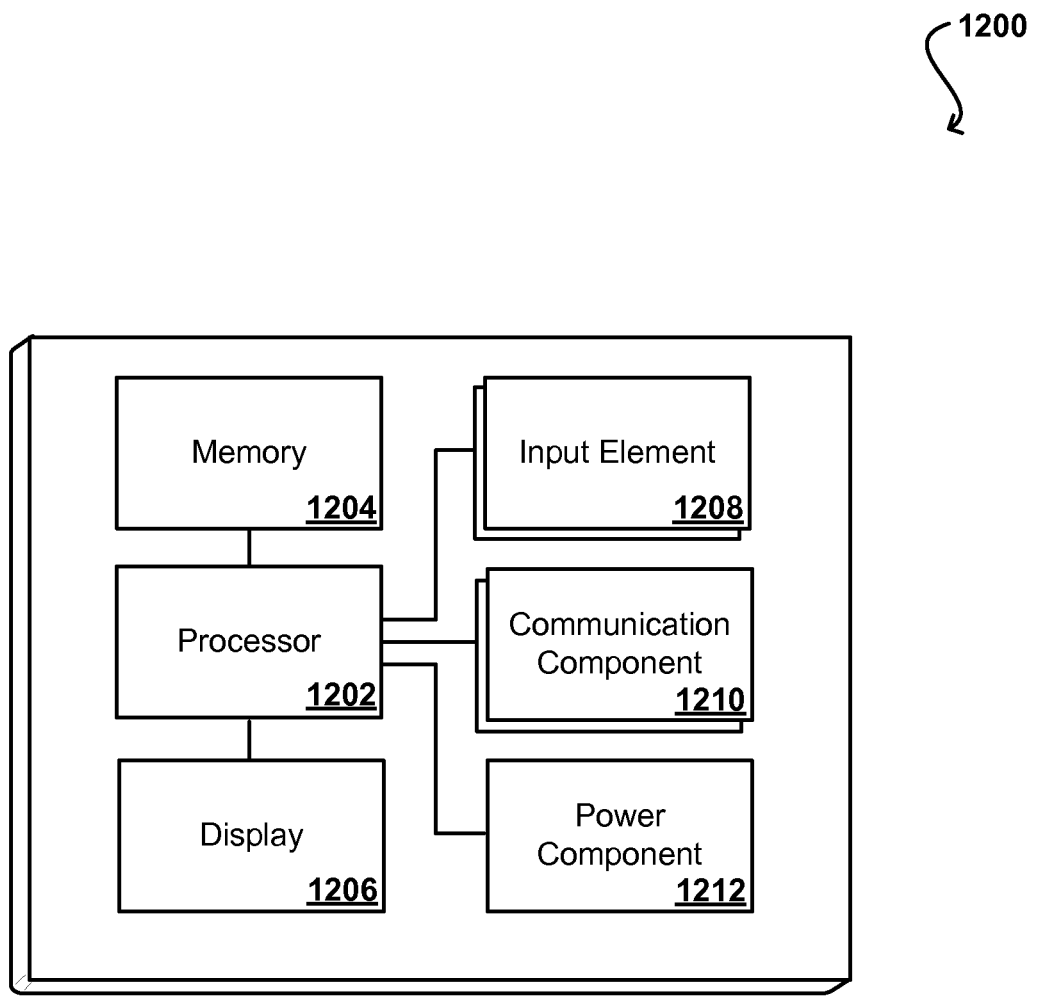
FIG. 12 illustrates components of an example computing device that can be used to perform aspects of the various embodiments.

FIG. 12 illustrates a logical arrangement of a set of general components of an example computing device that can be used to implement aspects of the various embodiments. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device may include some type of display element 1206, such as a touch screen or liquid crystal display (LCD), although devices such as portable media players might convey information via other means, such as through audio speakers. In some embodiments, the computing device 1200 can include one or more networking and/or communication elements 1208, such as a Wi-Fi, Bluetooth, RF, wired, or wireless communication system. The device in many embodiments can communicate with a network, such as the Internet, and may be able to communicate with other such devices. In some embodiments the device can include at least one additional input component 1210 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 1212, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle °, Microsoft®, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
provisioning a master storage volume and a slave storage volume in a block-based storage system, the slave storage volume providing a redundant copy of data stored in the master storage volume for a plurality of data operations, the data operations having a set of sequential operation numbers;
detecting a disconnect between the master storage volume and the slave storage volume;
causing the master storage volume to function as a solo master;
designating a log start operation number that corresponds to a last data operation committed by the master storage volume and the slave storage volume;
receiving at least one new data operation to the solo master;
provisioning a log storage volume to store, for the solo master, data operations having an operation number higher than the log start operation number and having offsets and lengths to address data on the solo master or the log storage volume;
forwarding the at least one new data operation to the log storage volume;
detecting a reconnect between the master storage volume and the slave storage volume;
forwarding the at least one new data operation, from one of the solo master or the log storage volume, to the slave storage volume; and
causing the solo master to return to functioning as a master storage volume for the slave storage volume after the slave storage volume is current with the solo master.

2. The computer-implemented method of claim 1, further comprising:
detecting a second disconnect between the master storage volume and the slave storage volume;
causing the master storage volume to function as the solo master;
provisioning a second log storage volume to store, for the solo master, data operations having an operation number higher than the log start operation number;
forwarding the at least one new data operation to the second log storage volume;
detecting a reconnect between the master storage volume and the slave storage volume; and
determining, based at least in part upon a volume of the at least one new data operation, to provision a new slave volume, data for the new slave volume being provided by at least one of the master storage volume and the second log storage volume.

3. The computer-implemented method of claim 1, further comprising:
detecting a second disconnect between the master storage volume and the slave storage volume;
causing the master storage volume to function as the solo master;
provisioning a second log storage volume to store, for the solo master, data operations having an operation number higher than the log start operation number;
forwarding the at least one new data operation to the second log storage volume;
detecting a reconnect between the master storage volume and the slave storage volume;
determining, based at least in part upon a volume of the at least one new data operation, to cause the second log storage volume to become the new slave volume; and
forwarding operations to the second log storage volume to cause the second log storage volume to be a current replica of the master storage volume.

4. The computer-implemented method of claim 1, further comprising:
deleting, from the solo master, data for data operations that have been at least one of noted or committed to the log storage volume.

5. The computer-implemented method of claim 1, further comprising:
provisioning the master storage volume and the slave storage volume to function as redundant peers, the redundant peers including a B-tree stored in a log partition and including a hierarchy of nodes corresponding to data operations with operation numbers, the data operations causing data to be stored to respective offset ranges of a data partition of the redundant peer, the master storage volume addressable as a block storage device and operable to receive data operations for a customer, the master storage volume further operable to forward the data operations to the slave storage volume for redundant storage.

6. A computer-implemented method, comprising:
detecting a disconnect between a master storage and a slave storage, the slave storage functioning as a redundant copy of the master storage;
selecting one of the master storage and the slave storage to function as a solo master;
committing, to the solo master, data operations received after the disconnect;
provisioning a log storage for the solo master;
forwarding the data operations to the log storage, the data operations having offsets and lengths to address data on the solo master or the log storage;
detecting a reconnect between the master storage and the slave storage;
determining a highest common operation number committed to both the master storage and the slave storage; and
causing operations having operation numbers higher than the highest common operation number to be committed to the master storage or to the slave storage.

7. The computer-implemented method of claim 6, further comprising:
deleting, from the slave storage, data corresponding to data operations committed to the slave storage before the disconnect but that is not committed to the master storage.

8. The computer-implemented method of claim 6, further comprising:
detecting a second disconnect between the master storage and the slave storage;
selecting one of the master storage and the slave storage to function as the solo master;
committing, to the solo master, additional data operations received after the second disconnect;
provisioning a second log storage for the solo master;

forwarding, to the second log storage, the additional data operations received after the second disconnect;
detecting a reconnect between the master storage and the slave storage; and
determining, based at least in part upon an amount of data for the additional data operations, to provision a new slave storage instead of causing operations having the operation numbers for the additional data operations to be committed to the master storage or to the slave storage.

9. The computer-implemented method of claim 8, further comprising:
creating the new slave storage based at least in part upon a snapshot of the master storage, the new slave storage including a data partition having an amount of allocated local storage determined from the snapshot, the new slave storage using the snapshot to generate a slave structure in a log partition of the new slave storage;
updating respective offset range for first records of the slave structure to point to offset ranges of the data partition of the new slave storage;
notifying the solo master that the new slave storage was successfully created;
causing data for second records of the snapshot to be transferred to the new slave storage and to be written to a corresponding offset range of the data partition; and
enabling the new slave storage to serve as a redundant copy of the master storage after the data from the master storage is replicated to the new slave storage.

10. The computer-implemented method of claim 9, further comprising:
causing the new slave storage to allocate more storage than is specified by the snapshot in order to account for new writes received to the solo master concurrent with transferring of the data for the snapshot from the solo master to the new slave storage.

11. The computer-implemented method of claim 6, further comprising:
detecting a second disconnect between the master storage and the slave storage;
selecting one of the master storage and the slave storage to function as the solo master;
committing, to the solo master, additional data operations received after the second disconnect;
provisioning a second log storage for the solo master;
forwarding, to the second log storage, the additional data operations received after the second disconnect;
detecting a reconnect between the master storage and the slave storage;
determining, based at least in part upon one or more selection criteria, to cause the second log storage to function as a new slave storage for the master storage; and
causing second data from at least one of the master storage or the slave storage to be forwarded to the new slave storage in order to cause the new slave storage to become a redundant copy of the master storage.

12. The computer-implemented method of claim 11, wherein the one or more selection criteria include at least one of an amount of data received since the second disconnect, a number of operations received since the second disconnect, or an amount of time since the second disconnect.

13. The computer-implemented method of claim 6, further comprising:
receiving additional data operations to the solo master concurrent with sending the data from the solo master to the slave storage;
committing the additional data operations to the solo master; and
forwarding the additional data operations to the slave storage.

14. The computer-implemented method of claim 6, further comprising:
obtaining at least a portion of the data operations having the operation numbers higher than the highest common operation number to be forwarded from an old storage peer of the master storage.

15. The computer-implemented method of claim 6, further comprising:
enabling the data operations received after the disconnect to be noted by the solo master in any order; and
ensuring that the data operations are committed by the solo master according to sequential operation numbers.

16. A system, comprising:
at least one processor; and
memory including instructions that, when executed by the at least one processor, cause the system to:
detect a disconnect between a master storage and a slave storage of a block-based storage system, the slave storage functioning as a redundant copy of the master storage;
select one of the master storage and the slave storage to function as a solo master;
commit, to the solo master, data operations received after the disconnect;
provision a log storage for the solo master;
forward the data operations to the log storage, the data operations having offsets and lengths to address data on the solo master or the log storage;
detect a reconnect between the master storage and the slave storage;
determine a highest common operation number committed to both the master storage and the slave storage; and
cause operations having operation numbers higher than the highest common operation number to be committed to the master storage or to the slave storage.

17. The system of claim 16, wherein the instructions when executed further cause the system to:
detect a second disconnect between the master storage and the slave storage;
select one of the master storage and the slave storage to function as the solo master;
commit, to the solo master, additional data operations received after the second disconnect;
provision a second log storage for the solo master;
forward, to the second log storage, the additional data operations received after the second disconnect;
detect a reconnect between the master storage and the slave storage; and
determine, based at least in part upon an amount of data for the additional data operations, to provision a new slave storage instead of causing operations having the operation numbers for the additional data operations to be committed to the master storage or to the slave storage.

18. The system of claim 16, wherein the instructions when executed further cause the system to:
detect a second disconnect between the master storage and the slave storage;

select one of the master storage and the slave storage to function as the solo master;
commit, to the solo master, additional data operations received after the second disconnect;
provision a second log storage for the solo master;
forward, to the second log storage, the additional data operations received after the second disconnect;
detect a reconnect between the master storage and the slave storage;
determine, based at least in part upon one or more selection criteria, to cause the second log storage to function as a new slave storage for the master storage; and
cause second data from at least one of the master storage or the slave storage to be forwarded to the new slave storage in order to cause the new slave storage to become a redundant copy of the master storage.

19. The system of claim 16, wherein the instructions when executed further cause the system to:
receive additional data operations to the solo master concurrent with sending the data from the solo master to the slave storage;
commit the additional data operations to the solo master; and
forward the additional data operations to the slave storage.

20. The system of claim 16, wherein the instructions when executed further cause the system to:
obtain at least a portion of the data operations having the operation numbers higher than the highest common operation number to be forwarded from an old storage peer of the master storage.

* * * * *